US007855238B2

(12) United States Patent
Cohoon et al.

(10) Patent No.: US 7,855,238 B2
(45) Date of Patent: Dec. 21, 2010

(54) MOLDING COMPOSITIONS CONTAINING POLYALKYLENE TEREPHTHALATES AND MODIFIED POLYBUTYLENE TEREPHTHALATE (PBT) RANDOM COPOLYMERS DERIVED FROM PET

(75) Inventors: Kristen Cohoon, Lutz, FL (US); Ganesh Kannan, Evansville, IN (US); Kenneth Frederick Miller, Posey, IN (US); Dhaval Shah, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/627,454

(22) Filed: Jan. 26, 2007

(65) Prior Publication Data

US 2008/0039571 A1    Feb. 14, 2008

Related U.S. Application Data

(60) Provisional application No. 60/763,091, filed on Jan. 27, 2006, provisional application No. 60/820,458, filed on Jul. 26, 2006.

(51) Int. Cl.
*C08J 11/04* (2006.01)
(52) U.S. Cl. .................... 521/48; 521/40; 521/40.5; 528/271; 528/272; 528/308.1; 528/308.2; 528/308.3; 525/436; 525/437; 264/219
(58) Field of Classification Search .............. 528/272, 528/212, 277, 295.3, 296, 302, 303, 304, 528/305, 306, 308.1, 308.2, 308.3, 308.6; 525/439, 436, 437; 521/40, 48, 48.5, 40.5, 521/41, 46, 47; 264/176.1, 219
See application file for complete search history.

(56) References Cited

U.S. PATENT DOCUMENTS

| | | | |
|---|---|---|---|
| 2,465,319 A | 3/1949 | Whinfield et al. | |
| 2,727,881 A | 2/1955 | Caldwell et al. | |
| 2,720,502 A | 10/1955 | Caldwell | |
| 2,822,348 A | 2/1958 | Haslam | |
| 3,047,539 A | 7/1962 | Pengilly | |
| 3,671,487 A | 6/1972 | Abolins | |
| 3,701,755 A | 10/1972 | Sumoto et al. | |
| 3,864,428 A | 2/1975 | Nakamura et al. | |
| 3,907,868 A | 9/1975 | Currie et al. | |
| 3,907,926 A | 9/1975 | Brown et al. | |
| 3,909,926 A | 10/1975 | Hutson | |
| 3,953,394 A | 4/1976 | Fox et al. | |
| 4,011,285 A | 3/1977 | Seymour et al. | |
| 4,096,156 A | 6/1978 | Freudenberger | |
| 4,128,526 A | 12/1978 | Borman | |
| 4,140,670 A | 2/1979 | Charles et al. | |
| 4,154,775 A | 5/1979 | Axelrod | |
| 4,157,325 A | 6/1979 | Charles et al. | |
| 4,184,997 A | 1/1980 | Wu | |
| 4,203,887 A | 5/1980 | Goedde et al. | |
| 4,264,487 A | 4/1981 | Fromuth et al. | |
| 4,337,192 A | 6/1982 | Campbell | |
| 4,355,155 A | 10/1982 | Nelson | |
| 4,469,851 A | 9/1984 | Charles et al. | |
| 4,579,884 A | 4/1986 | Liu | |
| 4,598,117 A | 7/1986 | Liu et al. | |
| 4,609,680 A | 9/1986 | Fujita et al. | |
| 4,767,668 A | 8/1988 | Smith et al. | |
| 4,992,506 A | 2/1991 | McCormick et al. | |
| 5,122,551 A | 6/1992 | Gallucci et al. | |
| 5,162,424 A | 11/1992 | de Boer et al. | |
| 5,266,601 A | 11/1993 | Kyber et al. | |
| 5,304,594 A | 4/1994 | Saitou | |
| 5,326,806 A | 7/1994 | Yokoshima et al. | |
| 5,451,611 A | 9/1995 | Chilukuri et al. | |
| 5,559,159 A | 9/1996 | Sublett et al. | |
| 6,087,591 A | 7/2000 | Nguyen et al. | |
| 6,162,837 A | 12/2000 | Gerking et al. | |
| 6,255,371 B1 | 7/2001 | Schlosser et al. | |
| 6,515,044 B1 * | 2/2003 | Idel et al. .................... 523/351 | |

(Continued)

FOREIGN PATENT DOCUMENTS

EP        127981        12/1984

(Continued)

OTHER PUBLICATIONS

Swedish Patent Office, International Search Report, International Application No. PCT/US07/074211, Date of Mailing: Mar. 6, 2007.

(Continued)

*Primary Examiner*—Ling-Siu Choi
*Assistant Examiner*—Frances Tischler
(74) *Attorney, Agent, or Firm*—Cantor Colburn LLP; Diderico van Eyl

(57) ABSTRACT

A molding composition comprising (a) from 5 to 90 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 5 to 40 wt % of a polyalkylene terephthalate component; wherein the modified polybutylene terephthalate random copolymer, the polyalkylene terephthalate component, and optionally, at least one additive, have a combined weight % of 100 wt %. Methods for making the composition and articles made from the composition.

43 Claims, No Drawings

U.S. PATENT DOCUMENTS

| | | | |
|---|---|---|---|
| 6,579,943 | B1 | 6/2003 | Ishino et al. |
| 6,660,789 | B2 | 12/2003 | Uno et al. |
| 6,689,838 | B1 * | 2/2004 | Fischer et al. ............... 525/88 |
| 6,706,843 | B1 | 3/2004 | Ishihara et al. |
| 6,849,684 | B2 | 2/2005 | Poppe et al. |
| 6,887,909 | B2 | 5/2005 | Kawamura et al. |
| 7,183,362 | B2 | 2/2007 | Hirokane et al. |
| 7,388,067 | B2 | 6/2008 | Leemans et al. |
| 2002/0012807 | A1 | 1/2002 | Kurian et al. |
| 2004/0059084 | A1 | 3/2004 | Hirokane et al. |
| 2005/0209435 | A1 | 9/2005 | Hirokane et al. |
| 2006/0270824 | A1 * | 11/2006 | Leemans et al. ............ 528/272 |
| 2007/0244242 | A1 | 10/2007 | Agarwal et al. |
| 2007/0275242 | A1 | 11/2007 | Gopal et al. |
| 2008/0125551 | A1 | 5/2008 | Vollenberg |

FOREIGN PATENT DOCUMENTS

| | | |
|---|---|---|
| EP | 0683201 | 11/1995 |
| EP | 1437377 | 7/2004 |
| GB | 1431916 | 4/1976 |
| GB | 1500577 | 2/1978 |
| GB | 2048285 A | 12/1980 |
| JP | 58-141236 A | 8/1983 |
| JP | 3-062848 A | 3/1991 |
| JP | 6-240121 A | 8/1994 |
| JP | 8-269311 A | 10/1996 |
| JP | 2000256472 | 9/2000 |
| JP | 2000256920 | 9/2000 |
| JP | 2002-179801 A | 6/2002 |
| JP | 2005-89572 | 7/2005 |
| KR | 20010083551 | 1/2001 |
| WO | 83/01253 A1 | 4/1983 |
| WO | 96/35216 A1 | 11/1996 |
| WO | WO9950332 | 10/1999 |
| WO | 9965987 | 12/1999 |
| WO | WO 03/066704 | 8/2003 |
| WO | 2007111774 | 10/2007 |

OTHER PUBLICATIONS

Swedish Patent Office, PCT Written Opinion of the ISA, International Application No. PCT/US07/074211, Date of Mailing: Mar. 6, 2007.

European Patent Office, International Search Report, International Application No. PCT/US07/002197, Date of Mailing: Jun. 19, 2007.

S.H. Mansour et al.,"Depolymerization of Poly(ethylene terephthalate) Waste Using 1, 4-Butanediol and Triethylene Glycol," Journal of Elastomers and Plastics; Apr. 2003, pp. 133-147, vol. 35, Sage Publications.

"GE Gives Plastic Bottle Recycling a New Spin"; ChemicalProcessing.com, Aug. 25, 2006 [online], accessed via the internet [retrieved on Oct. 16, 2009], URS: <http://www.chemicalprocessing.com/industrynews/2006/056.html>; 2 pages.

Pawlak,et al.; European Polymer Journal, 2000, 36, p. 1875-1884.

* cited by examiner

MOLDING COMPOSITIONS CONTAINING POLYALKYLENE TEREPHTHALATES AND MODIFIED POLYBUTYLENE TEREPHTHALATE (PBT) RANDOM COPOLYMERS DERIVED FROM PET

CROSS REFERENCE TO RELATED APPLICATION

This application claims the benefits of U.S. Provisional Patent Application Ser. No. 60/763,091 filed Jan. 27, 2006, and U.S. Provisional Patent Application Ser. No. 60/820,458, filed Jul. 26, 2006 which patent application is fully incorporated herein by reference.

BACKGROUND OF THE INVENTION

Polyethylene terephthalate (also referred to as "PET") is a polyester of terephthalic acid and ethylene glycol can be obtained by the polycondensation of dimethyl terephthalate with ethylene glycol, and also terephthalic acid with ethylene glycol or ethylene oxide. PET exists both as an amorphous (transparent) and as a semi-crystalline (opaque and white) thermoplastic material. Generally, it has useful chemical resistance to mineral oils, solvents and acids but not to bases. Semi-crystalline PET has good strength, ductility, stiffness and hardness. Amorphous PET has better ductility but less stiffness and hardness. PET is used to make bottles for soft drinks and other household and consumer products. Generally, PET has many uses and several large markets. For this reason, the volume of PET manufactured is large and growing.

Unfortunately, despite recycling efforts, billions of pounds of PET are still dumped into landfills annually all over the world. Other PET that is not reused is incinerated. The PET that is disposed into landfills creates significant waste. The incineration of PET wastes a significant resource that could be used more effectively.

Thermoplastic molding compositions based on polybutylene terephthalate (also referred to as "PBT") and polyalkylene terephthalate are used in various applications. Although useful to many customers, conventional PBT-polyalkylene terephthalate molding compositions generally cannot be made from recycle sources of PBT due to the lack of availability of large post-consumer or post-industrial PBT. PET, unlike PBT, is made in much larger quantities and is more easily recovered from consumer wastes. If PET (scrap) materials could be converted to PBT and converted into useful molding compositions, then there would exist a valuable way to meet the unmet need to effectively use underutilized scrap PET in PBT thermoplastic molding compositions. If PET (scrap) materials could be converted to PBT and converted into useful molding compositions, then there would be an effective use of post consumer or post-industrial streams. PBT made this way would conserve our non-renewable resources and reduce the formation of greenhouse gases, e.g., $CO_2$.

U.S. Pat. No. 5,451,611 teaches a process for converting waste polyethylene terephthalate to either poly(ethylene-co-butylene terephthalate) or poly butylene terephthalate (PBT) by reaction with 1,4-butanediol. In discussing the prior art, U.S. Pat. No. 5,451,611 indicates that in most of the processes it cites, the undesirable byproduct diethylene glycol is formed which contaminates the final product and has to be removed by purification before the recovered products can be reused again. A principal object of U.S. Pat. No. 5,451,611 was to provide a process for converting polyethylene terephthalate waste directly to another high value polymer without breaking down the polyethylene terephthalate to its constituent monomers or oligomers. The patent discloses numerous examples in which a variety of polymers have a diol incorporated at various amounts. Example 11 shows a PBT polymer being formed with a complete replacement of ethylene glycol with 1,4-butanediol.

U.S. Pat. No. 5,266,601 teaches a process for making "PBT" from PET by reacting PET with 1,4-butanediol. A principal object of U.S. Pat. No. 5,266,601 was to produce PBT containing less than 1.0 wt % units of ethylene glycol from PET scrap. Another principal objective of U.S. Pat. No. 5,266,601 was to develop a process that facilitates the reduction of THF generated in the process as much as possible to the extent that this PBT is economically competitive with PBT obtained from monomers. U.S. Pat. No. 5,266,601 emphasizes the production of PBT having ethylene glycol groups in an amount that is less than 1 wt %. In the instances where compositions contain more than 1 wt %, U.S. Pat. No. 5,266,601 presents these compositions in comparative examples. Such compositions are described as having "yellowish" and "slightly yellowish" colors, respectively.

Japanese laid-open application 2005-89572 teaches a method for producing polybutylene terephthalate by transesterifying bis(2-hydroxyethyl) terephthalate with 1,4-butanediol in the presence of a transesterification reaction catalyst under the pressure of 1-54 kPa at a final temperature ranging from 200-230° C. and then subjecting the reaction product to polycondensation. In one embodiment, the bis(2-hydroxyethyl) terephthalate is obtained by depolymerizing polyethylene terephthalate with excessive ethylene glycol, and purifying the depolymerized product. The patent teaches that transesterifying bis(2-hydroxyethyl) terephthalate with 1,4-butanediol under reduced pressure imparts favorable results.

Unfortunately, such documents do not meet the long felt need of improved use of PET scrap that is ordinarily incinerated or buried in landfills. U.S. Pat. No. 5,451,611, for instance, does not teach effective processes that enable PET to be able to be broken down into its constituent monomers or oligomers—a feature that is sometimes required by commercial considerations. U.S. Pat. No. 5,451,611 does not provide meaningful guidelines for making compositions functionally similar to PBT containing ethylene glycol in amounts other than trace amounts and which exhibit melting temperatures that are higher than those shown in its examples. Similarly, U.S. Pat. No. 5,266,601 does not provide meaningful details about how to make molding compositions containing combinations of polyalkylene terephthalates and PBT with a PET residue such as ethylene glycol in any amount, let alone an amount that is more than 1 wt %. In fact, neither patent discusses if or how the materials they describe can be used in molding compositions containing polyalkylene terephthalate and other materials such as flame retardants, epoxies, polycarbonates. Japanese laid-open application 2005-89572 is also silent about molding compositions containing fillers and PBT as well as methods for utilizing PET effectively to make such compositions. Known technology relating to utilizing PET as scrap materials for making PBT-like materials, in other words, does not provide meaningful solutions that solve the long felt need of new processes for better utilizing PET scrap that is ordinarily incinerated or buried in landfills. Known technology does not provide meaningful solutions that solve the long felt need of new thermoplastic compositions containing fillers, PBT derived from PET and a combination of physical properties that are highly useful and valued by customers.

For the foregoing reasons, there is a need to develop new molding compositions containing polyalkylene terephthalates that utilize PBT derived from PET and that have useful performance properties.

For the foregoing reasons, there is a need to develop new molding compositions that reduce the amount of $CO_2$ emissions.

For the foregoing reasons, there is a need to develop new processes for making molding compositions that utilize PBT derived from PET and that have useful performance properties.

BRIEF DESCRIPTION OF THE INVENTION

In one embodiment, the invention relates to a molding composition comprising:

(a) from 5 to 90 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 5 to 40 wt % of a polyalkylene terephthalate component;

wherein the modified polybutylene terephthalate random copolymer, the polyalkylene terephthalate component, and optionally, at least one additive, have a total combined weight % of 100 wt %.

In another embodiment, the invention relates to a molding composition comprising:

(a) from 5 to 90 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkali salts, alkaline earth metal salts phosphorous-containing compounds and anions, sulfur-containing compounds and anions, napthelane dicarboxylic acids, 1,3-propanediol groups, and combinations thereof.

(b) from 5 to 40 wt % of a polyalkylene terephthalate selected from the group consisting of polyethylene terephthalate, polycyclohexane terephthalate, copoly-esters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, polyxylylene terephthalate, polydianol terephthalates, polybutylene terephthalate, polyester naphthalates, and combinations thereof;

(c) an additive selected from the group consisting of flame retardants, stabilizers, quenchers, mold release agents, fillers, teflon-styrene acrylonitrile mixtures, and combinations thereof;

wherein the modified polybutylene terephthalate random copolymer, the polyalkylene terephthalate, the additive, and optionally, at least one additional additive, have a combined total weight % of 100 wt %.

In another embodiment, the invention relates to methods for making and methods for using the molding composition.

DETAILED DESCRIPTION OF THE INVENTION

The invention is based on the remarkable discovery that it is now possible to make molding compositions, which have useful physical properties, suitable in commercial applications, which contains a modified-PBT component derived from poly (ethylene terephthalate), e.g., used PET soft drink bottles and fillers. Unlike conventional molding compositions containing virgin PBT (PBT that is derived from monomers), the modified-PBT component used in the articles contains a polyethylene terephthlate residue, e.g., materials such as ethylene glycol and isophthalic acid groups (components that are not present in "virgin," monomer-based PBT). Advantageously, despite using a PBT that is structurally different from virgin PBT, our articles exhibit similar performance properties as articles made from molding compositions containing monomer-based PBT.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

All molecular weights in this application refer to number average molecular weight obtained with the polystyrene standard. Details of the technique include the following items: (i) Instrument: Waters 2695 separation module; (ii) Detector: Waters 2487 Dual Absorbance Ultraviolet Detector@273 and 295 nanometers and Water 410 refractomer; (iii) Mobile phase: 5% HFIP 95% chloroform; (iv) GPC columns: Polymer Labs PL HFIPgel 250×4.6 mm, (v) Flow rate: 0.3 ml/min; (vi) Injection volume 10 μl; (vii) Polystyrene standards: Polymer Lab's Easical PS-1, 580-7,500,000 Da.

For the sake of clarity, the terms terephthalic acid group, isophthalic acid group, butanediol group, ethylene glycol group in formulas have the following meanings. The term "terephthalic acid group" (R') in a composition refers to a divalent 1,4-benzene radical (-1,4-($C_6H_4$)—) remaining after removal of the carboxylic groups from terephthalic acid-. The term "isophthalic acid group" (R") refers to a divalent 1,3-benzene radical (-(-1,3-$C_6H_4$)—) remaining after removal of the carboxylic groups from isophthalic acid. The "butanediol group" (D) refers to a divalent butylene radical (—($C_4H_8$)—) remaining after removal of hydroxyl groups from butanediol. The term "ethylene glycol group" (D') refers to a divalent ethylene radical (—($C_2H_4$)—) remaining after removal of hydroxyl groups from ethylene glycol-). With respect to the terms "isophthalic acid group," "ethylene glycol group," and "diethylene glycol group" being used in other contexts, e.g., to indicate the weight % of the group in a composition, the term "isophthalic acid group(s)" means the group having the formula (—O(CO)$C_6H_4$(CO)—), the term "terephthalic acid group(s)" means the group having the formula (—O(CO)$C_6H_4$(CO)—), the term diethylene glycol group means the group having (—O($C_2H_4$)O($C_2H_4$)—), the term "butanediol group(s)" means the group having the formula (—O($C_4H_8$)—), and the term "ethylene glycol groups(s)" means the group having formula (—O($C_2H_4$)—).

An embodiment of the invention relates to a molding composition comprising:

(a) from 5 to 90 wt % of a modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component, and (b) from 5 to 40 wt % of a polyalkylene terephthalate component; wherein the modified polybutylene terephthalate random copolymer, the polyalkylene terephthalate component, and optionally, at least one additive, have a total combined weight % of 100 wt %.

The modified polybutylene terephthalate component derived from polyethylene terephthalate (PET-derived modified PBT component) is (1) is derived from polyethylene terephthalate component selected from the group consisting of polyethylene terephthalate and polyethylene terephthalate copolymers and (2) has at least one residue derived from the polyethylene terephthalate component. In one embodiment, the modified polybutylene terephthalate component can further be derived from a biomass-derived 1,4-butanediol, e.g. corn derived 1,4-butanediol or a 1,4-butane-diol derived from a cellulosic material. Such embodiments can include a modified polybutylene terephthalate random copolymer is derived from 1,4-butanediol that is derived from 1,4 butane dicarboxylic acid that is derived from biomass.

The residue derived from the polyethylene terephthalate component, which is present in the modified polybutylene terephthalate component can be selected from the group consisting of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the 1,3-trans isomer of cyclohexane dimethanol, the 1,4-trans isomer of 1,4-cyclohexane dimethanol, alkali salts, alkaline earth metal salts, e.g., calcium, magnesium, sodium and potassium salts, phosphorous-containing compounds and anions, sulfur-containing compounds and anions, napthelane dicarboxylic acids, 1,3-propanediol groups, and combinations thereof.

Depending on factors such as polyethylene terephthalate and polyethylene terephthalate copolymers, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terephthalate further includes cis isomer of 1,3-cyclohexanedimethanol, 1,4-cyclohexanedimethanol, trans isomer of 1,-3 cyclohexane dimethanol, trans isomer of 1,4 cyclohexane dimethanol and combinations thereof. In another embodiment, the residue includes cis isomer of 1,3-cyclohexanedimethanol, 1,4-cyclohexanedimethanol, trans isomer of 1,-3 cyclohexane dimethanol, trans isomer of 1,4 cyclohexane dimethanol and combinations thereof. And in another embodiment, the residue can be a mixture of ethylene glycol, diethylene glycol, isophthalic acid groups, cis isomer of cyclohexane dimethanol, trans isomer of cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid groups.

The total amount of materials of the polyethylene terephthalate component residue in the modified polybutylene tereghthalate random copolymer can vary. For instance, mixtures can be in an amount ranging from 1.8 to 2.5 wt. %, or from 0.5 to 2 wt. %, or from 1 to 4 wt. %. The ethylene glycol, diethylene glycol, and cyclohexane dimethanol groups can be individually or in combination present in an amount ranging from 0.1 to 10 mole %, based on 100 mole % of glycol in the modified polybutylene terephthalate random copolymer. The isophthalic acid groups can be present in an amount ranging from 0.1 to 10 mole %, based on 100 mole % of diacid/diester in the modified polybutyene terephalate random copolymer.

It has been discovered that when it is desirable to make a polybutylene terephthalate copolymers having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 23 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 3 and less than or equal to 10 equivalents, relative to the total of 100 equivalents of diol and 100 equivalents of diacid groups in the modified polybutylene terephthalate random copolymer. In another suitable embodiment, the total amount of the isophthalic acid groups, ethylene glycol groups, and diethylene glycol groups ranges from 10 and less than or equal to 23 equivalents, relative to the total of 100 equivalents of diol and 100 equivalents of diacid groups in the modified polybutylene terephthalate random copolymer. In one embodiment, diethylene glycol, ethylene glycol and/or isophthalic acid can be added during the process.

The PET component from which the modified polybutylene terephthalate random copolymer is made can be in any form that can be used according to our invention. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid and other contaminants. Also, the PET component can include PET that is not waste in flake, chip or pellet form. As such, PET that would ordinarily be deposited in landfills can now be used productively and effectively. In one embodiment, PET component can also include other polyesters. The PET component can also include polyester copolymers. Examples of such materials include polyalkylene terephthalates that can be selected from polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polybutylene terephthalate, poly-xylylene terephthalate, polydianol terephthalates, polybutylene terephthalate, polytrimethylene terephthalate, polyester naphthalates, and combinations thereof A modified polybutylene terephthalate random copolymer derived from the polyethylene terephthalate component can be derived from a polyethylene terephthalate component by any method that involves depolymerization of a polyethylene terephthalate component and polymerization of the depolymerized polyethylene terephthalate component with 1,4-butanediol into the modified polybutylene terephthalate random copolymer. For instance, the modified polybutylene terephthalate component derived from the polyethylene terephthalate component can be made by a process that involves depolymerizing a polyethylene terephthalate component selected from the group consisting of polyethylene terephthalate and polyethylene terephthalate copolymers with a 1,4-butanediol component at a temperature ranging from 180° C. to 230° C., under agitation, at a pressure that is at least atmospheric pressure in the presence of a catalyst component, at an elevated temperature, under an inert atmosphere, to produce a molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and agitating the molten mixture at subatmospheric pressure and increasing the temperature of the molten mixture to an elevated temperature under conditions sufficient to form a modified random polybutylene terephthalate copolymer containing at least one residue derived from the polyethylene terepthalate component.

Polyester moieties and the 1,4-butanediol are combined in the liquid phase under agitation and the 1,4-butanediol can be continuously refluxed back into the reactor during step (a). The THF and water formed in the stage can be removed by distillation or partial condensation.

The polyethylene terephthalate component and the 1,4-butanediol component are generally combined under atmospheric pressure. In another embodiment of the invention, however, it is possible to use pressures that are higher than atmospheric pressures. For instance, in one embodiment, the pressure at which the polyethylene terephthalate component and the 1,4-butanediol are subjected to is 2 atmospheres, or higher. For higher pressures, the reaction mixtures can be depolymerized at temperatures higher than 230° C.

The temperature at which the polyethylene terephthalate component and the 1,4-butanediol component are combined and reacted is sufficient to promote depolymerization of the polyethylene terephthalate component into a mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof. The temperature at which the polyethylene terephthalate component and the 1,4-butanediol component are combined generally ranges from 180° C. to 230° C. 1,4-butanediol is generally used in excess amount relative to the polyethylene terephthalate component. In one embodiment, 1,4-butanediol is used in a molar excess amount ranging from 2 to 20.

During the initial stage of the process when the polyethylene terephthalate component and the 1,4-butanediol are combined and react ("step (a)"), the polyethylene terephthalate component and the 1,4-butanediol depolymerize into a molten mixture at a pressure that is at least atmospheric pressure suitable conditions. 1,4-butanediol, ethylene glycol, are generally recirculated, and tetrahydrofuran is distilled during "step (a)" of the process. The molten mixture contains oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof.

The duration of the step in which polyethylene terephthalate component reacts with 1,4-butanediol can vary, depending on factors, such as available equipment, production needs, desired final properties, and the like. In one embodiment, this step is carried out in at least 2 hours. In another embodiment, the step is carried out from 2 to 5 hours.

The process further includes the step of subjecting the molten mixture to subatmospheric pressure and increasing the temperature of the molten mixture to a temperature ranging from 240° C. to 260° C., and thereby forming the modified polybutylene terephthalate component derived from the polyethylene terephthalate component.

Excess butanediol, ethylene glycol, and tetrahydrofuran (THF) are preferably removed and step (b) is carried out under agitation. The molten mixture, when placed in subatmospheric pressure conditions at a suitable temperature for a sufficiently long time period, polymerizes into a modified polybutylene terephthalate component derived from the polyethylene terephthalate component random copolymer.

Generally, the molten mixture pressure is subjected to a pressure ranging from subatmospheric to less than 1 Torr. In one embodiment, the pressure is reduced to a pressure ranging from 100 to 0.05 Torr in a continuous manner. In another embodiment, the pressure is reduced to a pressure ranging from 10 to 0.1 Torr in a continuous fashion.

Advantageously, the molten mixture can be placed under subatmospheric conditions without isolation and dissolution of any material from the molten mixture. The avoidance of this step greatly enhances the utility of the process.

During the step when the molten mixture is placed under subatmospheric conditions and the temperature is increased, excess butanediol, ethylene glycol and THF are removed from the reactor and oligomers are allowed to build in molecular weight. Agitation can be continuously provided to facilitate the removal of the low boiling components and allow the molecular weight buildup of the polymer. After sufficient molecular weight is obtained, the resulting molten PBT polymer is cast from the reactor through a diehead, cooled with water, stranded and chopped into pellets.

The duration of the step (step (b) discussed above) in which the molten mixture polymerizes from polyethylene terephthalate and poly(butylene terephthlate) oligomers, 1,4, butanediol, and ethylene glycol can vary, depending on factors, such as equipment available, production needs, desired final properties, and the like. In one embodiment, this step is carried out in at least two hours. In another embodiment, the step is carried out from 2 to 5 hours.

The temperature at which the molten mixture is placed under subatmospheric conditions is sufficiently high to promote polymerization of the polyethylene terephthalate and poly(butylene terephthlate) oligomers, 1,4,-butanediol, and ethylene glycol to the modified polybutylene terephthalate component derived from the polyethylene terephthalate component. Generally, the temperature is at least 230° C. In one embodiment, the temperature ranges from 250° C. to 275° C.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

The catalyst component that is used to facilitate the reaction of the process generally includes a catalyst that facilitates the reaction. The catalyst can be selected from antimony compounds, tin compounds, titanium compounds, combinations thereof as well as many other metal catalysts and combinations of metal catalysts that have been disclosed in the literature. The amount of the catalyst will vary on the specific need at hand. Suitable amounts of the catalyst range from 1 to 5000 ppm, or more.

The catalyst component is generally added during the step when the polyethylene terephthalate component initially combines with the 1,4-butanediol. In another embodiment, however, the catalyst component may be added to the molten mixture that forms after the polyethylene terephthalate component and the 1,4-butanediol component are combined.

The process for making the modified polybutylene terephthalate component derived from the polyethylene terephthalate component is preferably carried out under agitative conditions. The term "agitative conditions" or "agitation" refers to subjecting the polyethylene terephthalate component and the 1,4-butanediol or the molten mixture to conditions that involve physically mixing the polyethylene terephthalate component 1,4-butanediol or molten mixture under conditions that promote the depolymerization of the PET when the agitative conditions are applied to polyethylene terephthalate component 1,4-butanediol "step (a)", or the polymerization of the PBT from polyethylene terephthalate oligomers, 1,4-butanediol, and ethylene glycol "step (b)." The physical mixing can be accomplished by any suitable way. In one embodiment, a mixer containing rotating shaft and blades that are perpendicular to the shaft can be used.

The process for making the modified polybutylene terephthalate component derived from the polyethylene terephthalate component can include a step that reduces the amount of THF produced during the process by adding a basic compound containing an alkali metal to the reactor in step (a) and thereby reducing formation of THF.

The basic compound contains an alkali metal and can be selected from one or more of the following compounds sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminium alkoxides, aluminium hydroxide, aluminium acetate, aluminium carbonate, aluminium bicarbonates, and combinations thereof.

The amount of the basic compound added to a mixture is generally at least 0.1 ppm. In one embodiment, the amount of the basic compound is from 0.1 to 50 ppm. In another embodiment, the amount of the basic compound ranges from 1 to 10 ppm.

The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more.

In another embodiment, a difunctional epoxy compound can be added to reduce the formation of THF. The epoxy compounds may be selected from the group of difunctional epoxies. Examples of suitable difunctional epoxy compounds include and are not limited to difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate. The amount of the epoxy that may be added to the mixture is generally at least 0.05 wt. %. In one embodiment, the amount of the epoxy compound is from 0.1 to 1 wt. %. In another embodiment, the amount of the epoxy compound was 0.2 to 0.5 wt. %. In one embodiment, the invention provides an additional embodiment in which THF production is reduced by a process that involves the steps of:

(a) reacting (i) a polyethylene terephthalate component selected from the group consisting of polyethylene terephthalate and polyethylene terephthalate copolymers with a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the polyethylene terephthalate component into a first molten mixture containing components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the polyethylene terephthalate component and the diol component are combined under agitation;

(b) adding 1,4-butanediol to the first molten mixture in a reactor in the presence of a catalyst component at a temperature ranging from 190° C. to 240° C., under conditions that are sufficient to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming a modified random polybutylene terephthalate copolymer containing at least one residue derived from the polyethylene terepthalate component.

This three step embodiment provides an additional advantageous way for producing modified PBT random copolymers from PET. The diol component used in step (a) of the three step embodiment can be selected from ethylene glycol, propylene glycol, and combinations thereof. The diol component can be present in step (a) at a molar amount that is at least half the amount of ethylene glycol moieties present in the polyethylene terephthalate component. The depolymerization of the polyethylene terephthalate component can be carried out for various times. In one embodiment, the depolymerization is carried out for at least 25 minutes.

The 1,4-butanediol used during step (b) of the three step embodiment can be added at a molar amount that is in excess relative to the molar amount of butanediol moieties incorporated into the modified polybutylene terephthalate random copolymer component obtained in step (c).

During the process the compounds used in the process can be reused and/or collected. In one embodiment, the diol component selected from the group consisting of ethylene glycol, propylene glycol, and combinations thereof and (2) 1,4-butanediol are removed and collected in a vessel in step (b). In another embodiment, in step (b), 1,4-butanediol is refluxed back into the reactor and a component selected from the group of excess butanediol, ethylene glycol, propylene glycol, tetrahydrofuran, and combinations thereof is removed. Step (b) is practiced for a sufficient period of time to reduce at least 65% of ethylene glycol from the second molten mixture. The duration of step (b) can also vary. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure ranging from 300 to 1500 mbar absolute. In another embodiment, 1,4-butanediol is used in a molar excess amount ranging from 1.1 to 5.

Step (c) of the three step embodiment can also be carried out with modifications, depending on the application. In one embodiment, for instance, a component selected from the group of excess butanediol, ethylene glycol, propylene glycol, tetrahydrofuran, and combinations thereof is removed during step (c). The pressure at which step (c) is carried out can also vary. In one embodiment, step (c) is carried out at a pressure that is less than 10 mbar. The three step process can be carried out in the same reactor. Alternatively, the three step process can be carried out in at least two reactors.

In another embodiment, the three step process can include the step of adding a basic compound during step (a), step (b), step (c), and combinations thereof, and thereby further reduce THF production. The basic compound, as in the two step embodiment, can contain those compounds mentioned above. Alternatively, difunctional epoxy compounds can be added during step (b) in the amounts indicated above.

Advantageously the three step process can reduce tetrahydrofuran by an amount that is at least 30% as compared to the amount of tetrahydrofuran produced by a process that depolymerizes polyethylene terephthalate component with 1,4-butanediol instead of the diol component selected from the group consisting of ethylene glycol, propylene glycol, and combinations thereof.

The process for making the modified polybutylene terephthalate component derived from the polyethylene terephthalate component may contain an additional step in which the PBT formed from the molten mixture is subjected to solid-state polymerization. Solid-state polymerization generally involves subjecting the PBT formed from the molten mixture to an inert atmosphere or subatmospheric pressure and heating to a temperature for a sufficient period of time to build the molecular weight of the PBT. Generally, the temperature to which the PBT is heated is below the melting point of the PBT, e.g., from 5° C. to 60° C. below the melting point of the PBT. In one embodiment, such a temperature may range from 150° C. to 210° C. Suitable periods of time during which the solid-state polymerization occurs may range from 2 to 20 hours, depending on the conditions and equipment. The solid-state polymerization is generally carried out under tumultuous conditions sufficient to promote further polymerization of the PBT to a suitable molecular weight. Such tumultuous conditions may be created by subjecting the PBT to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

Our invention includes an embodiment in which the 1,4-butanediol can be derived from biomass. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols; diacids; monomers used to make diols or acids, e.g., succinic acid; monomers used to make polymers; and the like. Biomass based butanediol can be obtained from several sources. For instance, the following process can be used to obtain biomass-based 1,4-butanediol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butanediol by processes described in several published documents such as in U.S. Pat. No. 4,096,156, incorporated herein in its entirety. Bio-mass derived-1,4-butanediol can also be converted to tetrahydrofuran, and further converted to polytetrahydrofuran, also known as polybutylene oxide glycol. Another process that describes converting succinic acid into 1,4-butanediol is described in Life Cycles Engineering Guidelines, by Smith et al., as described in EPA publication EPA/600/R-1/101 (2001).

The amount of the modified polybutylene terephthalate random copolymer that (1) is derived from polyethylene terephthalate component selected from the group consisting of polyethylene terephthalate and polyethylene terephthalate copolymers and (2) at least one residue derived from the polyethylene terephthalate component varies with the specific application. Generally, the amount of the PET-derived modified PBT component in a molding composition of the invention ranges from to 5 to 90 wt. %. In another embodiment, the amount of the PET-derived modified PBT component is present ranges from 10 to 50 wt. %.

In one embodiment, scrap (or pre-used) polyethylene terephthalate can be used in conjunction with conventionally prepared polyethylene terephthalate or instead of conventionally prepared polyethylene terephthalate. The amount of the scrap polyethylene terephthalate can be used in various ranges. In one embodiment, the amount of scrap polyethylene terephthalate is at least 5 wt %. In another embodiment, the amount of scrap polyethylene terephthalate ranges from 5 to 90 wt. %.

The polyalkylene terephthalate component can be any polyalkylene terephthalate, which when combined with the modified polybutylene terephthalate random copolymer, can produce a composition suitable for an intended application. Examples of polyalkylene terephthalate can selected from the group polyethylene terephthalate, polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, poly-xylylene terephthalate, polydianol terephthalates, polybutylene terephthalate, polyester naphthalates, and combinations thereof. The amount of the polyalkylene terephthalate can vary, depending on situation. Generally, the amount of the polyalkylene terephthalate component is at least 5 wt %. In another embodiment, the amount can range from 5 to 20 wt %. In another embodiment, the amount can range from 5 to 40 wt %.

In one embodiment our composition can also include fillers. The filler component of the molding compositions generally includes inorganic fillers to the thermoplastic resin provide higher tensile modulus, density and low coefficient of thermal expansion without deleteriously affecting the other favorable properties. Examples of suitable inorganic fillers include: alumina, amorphous silica, anhydrous alumino silicates, mica, wollastonite, barium sulfate, zinc sulfide, clays, talc, metal oxides such as titanium dioxide. Low levels (0.1-10.0 wt. %) of very small particle size (largest particles less than 10 microns in diameter) are useful in one embodiment. In one embodiment, the filler are present in an amount that is at least 1 wt %, and the fillers are selected from the group consisting of glass fillers, ceramic fillers, carbon fillers, nanofillers, nano-tubes, nano-composites, and combinations thereof.

A particularly suitable embodiment of fillers includes reinforcing fibers such as glass, ceramic and carbon and are generally well known in the art, as are their methods of manufacture. In one embodiment, glass is particularly suitable, especially glass that is relatively soda free. Fibrous glass filaments comprised of lime-alumino-borosilicate glass, which is also known as "E" glass are often especially suitable. Glass fiber is added to the composition to increase the flexural modulus and strength. The glass filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 microns are required with a diameter of from 10-15 microns being preferred. In preparing the molding compositions it is convenient to use the fiber in the form of chopped strands of from about ⅛" (3 mm) to about ½" (13 mm) long although roving may also be used. In articles molded from the compositions, the fiber length is typically shorter presumably due to fiber fragmentation during compounding of the composition. The length of such short glass fibers present in final molded compositions is less than about 4 mm. The fibers may be treated with a variety of coupling agents to improve adhesion to the resin matrix. Preferred coupling agents include; amino, epoxy, amide or mercapto functionalized silanes. Organo metallic coupling agents, for example, titanium or zirconium based organo metallic compounds, may also be used.

Other preferred sizing-coated glass fibers are commercially available from Owens Corning Fiberglass as, for example, OCF K filament glass fiber 183F.

In another embodiment, long glass fibers can be used, wherein a continuous glass fiber bundle containing glass fiber monofilaments having a diameter in the range, 10-24 μm, preferably 13-18 μm is impregnated with a melted thermoplastic preferably a polyester. After cooling, the impregnated bundle is cut into pellets having a length of >5 mm, preferably, above >9 mm. For impregnation, a high flow polyester of the present invention can be used in order to improve the wetting rate of the filaments to make long glass fiber pellets. These pellets can be incorporated into the polyester compositions of the invention, to get long fiber glass reinforced polyester compositions. The length of long glass fiber present in molded composition prepared by this method is typically greater than that prepared by incorporation of short fibers and the predominant portion of the long glass fibers present have a length >4 mm in the molded part. Such long fiber glass reinforced compositions can be used for different molding techniques such as injection molding, compression molding, thermoforming and the like. As in the case of short fibers, the long fibers may also be treated with a variety of coupling agents to improve adhesion to resin. For those skilled in the art, a continuous process such as pultrusion technique for direct incorporation of long glass fibers in high flow polyester compositions will also be possible.

Additionally PET-derived PBT can be incorporated into chopped strands of glass as a powder in a papermaking process. PET-derived PBT can be incorporated into continuous glass tapes through a pultrusion or a powder incorporation method or through a rod or shape pultrusion process.

Other fillers and reinforcing agents may be used alone or in combination with reinforcing fibers. These include but are not limited to: carbon fibrils, mica, talc, barytes, calcium carbonate, wollastonite, milled glass, flaked glass, ground quartz, silica, zeolites, and solid or hollow glass beads or spheres, polyester fibers or aramid fibers.

The glass fibers may be blended first with the PET-derived PBT component and then fed to an extruder and the extrudate cut into pellets, or, in a preferred embodiment, they may be separately fed to the feed hopper of an extruder. In a highly suitable embodiment, the glass fibers may be fed downstream in the extruder to minimize attrition of the glass. Generally, for preparing pellets of the composition set forth herein, the extruder is maintained at a temperature of approximately 480 F to 550° F. The pellets so prepared when cutting the extrudate may be one-fourth inch long or less. As stated previously, such pellets contain finely divided uniformly dispersed glass fibers in the composition. The dispersed glass fibers are reduced in length as a result of the shearing action on the chopped glass strands in the extruder barrel.

In one embodiment, the filler component includes nanofillers. Suitable nanofillers can include silicates, generally clays, in particular phyllosilicates such as montmorillonite, nontronite, beidelite, volkonskoite, hectorite, saponite, sauconite, magadiite, medmontite, fluorohectorite, vermiculite, kaolinite. Clays, in particular phyllosilicates, which have a lamellar structure, contain for example alkali cations such as $K^+$ or $Na^+$ or alkaline-earth cations or even organic cations such as alkylammonium or alkylsulphonium ions, obtained by ion exchange reactions, between their lamellae. Other nanoparticle includes, nano particles of metal oxides such as titanium oxides, silicon oxides, and the like. Nanofillers can be present in an amount that is more than 0 and less than 0.5 wt. %, as well as other amounts.

The fillers can include organic fibers. Organic fibers include and are not limited to synthetic polymer fibers such as polyamides, e.g., Kevlar™ fibers, or natural fibers. Examples of suitable fibers include coconut fibers, jute fibers, flax fibers, and naturally occurring cellulosic fibers. These fibers can be used individually or in combination with other fibers or other filler described herein. Since natural fibers are derived from biomass, such as plant sources, such a feature is attractive to some customers who are increasingly interested in using such materials. Also, the use of organic or natural fibers generally result in parts having a relative low densities and relatively lower weights.

The amount of the filler component in a composition used to make an article is generally at least 1 wt. %. In one embodiment, the amount of the filler component ranges from 5 wt. % to 70 wt % or from 10 to 70 wt %. In another embodiment, the amount of the filler component ranges from 30 to 50 wt. %. When organic fibers are used as fillers, the amount of organic fibers can range from 1 to 50 wt %. In one embodiment, for instance, the fillers are present in an amount that is at least 1 wt %, and the fillers are selected from the group consisting of glass fillers, ceramic fillers, carbon fillers, metal fillers, mineral fillers, nano-fillers, nano-tubes, talc, and combinations thereof. In another embodiment, the fillers are nanotubes and the nanotubes are present in an amount that is less than 1 wt %. In another embodiment, the amount of the filler component ranges from 30 to 50 wt. %. An artisan, however, will appreciate the amounts for specific materials can vary, depending on the embodiments. Low levels, e.g., from 0.1 to 10.0 wt. % of fillers having a very small particle size (where largest particles are less than 10 microns in diameter) are useful in one embodiment.

In one embodiment, the composition contains a component. The flame-retarding component can be combined with the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphate esters, phosphates, halogenated phosphorus compounds and inorganic phosphorus containing salts).

Inorganic flame retardants can include metal hydroxides, antimony compounds, boron compounds, other metal compounds, phosphorous compounds, other inorganic flame retardant compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame-retarding component can be added the composition to suppress, reduce, delay or modify the propagation of a flame through a composition or an article based on the composition. The flame-retarding component can be halogenated hydrocarbons (chlorine and bromine containing compounds and reactive flame retardants), inorganic flame retardants (boron compounds, antimony oxides, aluminum hydroxide, molybdenum compounds, zinc and magnesium oxides), phosphorous containing compounds (organic phosphates, phospinates, phosphites, phosphonates, phosphene, halogenated phosphorus compounds and inorganic phosphorus containing salts) and nitrogen containing compounds like melamine cyanurate.

Inorganic flame retardants can include metal hydroxides, antimony compounds, boron compounds, other metal compounds, phosphorous compounds, other inorganic flame-retarding compounds. Examples of suitable metal hydroxides include magnesium hydroxide, aluminum hydroxide, and other metal hydroxides. Examples of suitable antimony-based flame retardants include antimony trioxide, sodium antimonate, antimony pentoxide, and other antimony-based inorganic compounds. Examples of suitable boron compounds include zinc borate, boric acid, borax, as well as other boron-based inorganic compounds. Examples of other metal compounds include molybdenum compounds, molybdenum trioxide, ammonium octa molybdate (AOM), zirconium compounds, titanium compounds, zinc compounds such as zinc stannate, zinc hydroxy-stannate, as well as others.

The flame retarding component can include halogen-containing compounds. Examples of suitable halogenated organic flame retardants can include brominated flame retardants, chlorinated flame retardants. Examples of such flame retardants include tetrabromobisphenol A, octabromobiphenyl ether, decabromodiphenyl ether, bis(tribromophenoxy)ethane, tetrabromobiphenyl ether, hexabromocyclododecane, tribromophenol, bis(tribromophenoxy)ethane tetrabromobisphenol A polycarbonate oligomers, tetrabromobisphenol A epoxy oligomers. Typically halogenated aromatic flame-retardants include tetrabromobisphenol a polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

Chlorinated flame retardants include chlorinated paraffins, bis (hexachlorocyclopentadieno)cyclo-octane as well other such functionally equivalent materials.

The flame-retarding component can include phosphorous-containing compounds. Examples of suitable phosphorous flame retardants include red phosphorus, ammonium polyphosphate. Organophosphorous flame retardants can include halogenated phosphates, non-halogenated compounds. Examples of such materials include tris(1-chloro-2-propyl) phosphate, tris(2-chloroethyl) phosphate, tris(2,3-dibromopropyl) phosphate, phosphate esters, trialkyl phosphates, triaryl phosphates, aryl-alkyl phosphates, and combinations thereof. Other flame retardants can include polyols, phosphonium derivatives, phosphonates, phosphanes, phosphines.

Specific structures of phosphorous-containing compounds are discussed below:

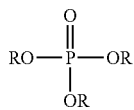

phosphate, where R can be selected from the group of alkyl, aryl, aralkyl, cyclohexyl, isopropyl, isobutyl, and the like.

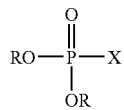

phosphonate, where X is H, and R, where R can be selected from the group of alkyl, aryl, aralkyl, cyclohexyl, isopropyl, isobutyl, and the like.

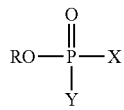

phosphinate, where X and Y=H, and R, where R can be selected from the group of alkyl, aryl, aralkyl, cyclohexyl, isopropyl, isobutyl, and the like, OH, amino functionalized compounds.

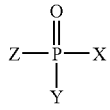

phosphine oxide, where X, Y, Z=H and R, where R can be selected from the group of alkyl, aryl, aralkyl, cyclohexyl, isopropyl, isobutyl, and the like.

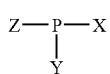

phosphine, where x, y, and z can be selected from the group of H, alkyl, aryl, aralkyl, and the like.

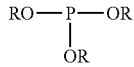

phosphite, where R can be selected from the group of alkyl, aryl, aralkyl, cyclohexyl, isopropyl, isobutyl, and the like, and H.

As such, suitable flame-retarding that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Di- or polyfunctional aromatic phosphorus-containing compounds are also useful, for example, compounds of the formulas below:

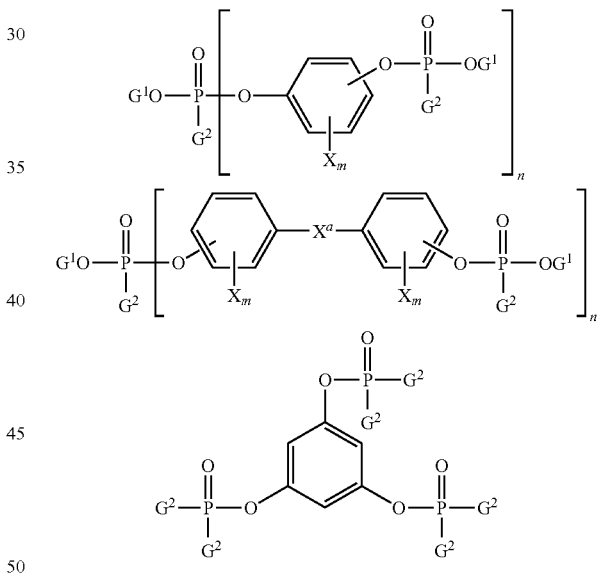

wherein each $G^1$ is independently a hydrocarbon having 1 to about 30 carbon atoms; each $G^2$ is independently a hydrocarbon or hydrocarbonoxy having 1 to about 30 carbon atoms; each $X_m$ is independently a bromine or chlorine; m is 0 to 4; and n is 1 to about 30. Examples of suitable di- or polyfunctional aromatic phosphorus-containing compounds include resorcinol tetraphenyl diphosphate (RDP), the bis (diphenyl) phosphate of hydroquinone and the bis(diphenyl) phosphate of bisphenol-A, respectively, their oligomeric and polymeric counterparts, and the like.

Exemplary suitable flame-retarding compounds containing phosphorus-nitrogen bonds include phosphonitrilic chloride, phosphorus ester amides, phosphoric acid amides, phosphonic acid amides, phosphinic acid amides, tris(aziridinyl) phosphine oxide. When present, phosphorus-containing flame retardants are generally present in amounts of about 1 to about 20 parts by weight, based on 100 parts by weight of the total composition.

In one embodiment, the flame-retarding polyester composition includes a flame retarding quantity of one or a mixture of nitrogen-containing flame retardants such as triazines, guanidines, cyanurates, and isocyanurates. Suitable triazines have the formula

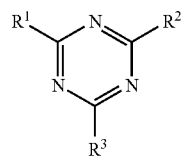

wherein R1, R2, and R3 are independently C1-C12 alkyl, C1-C12 alkoxyl, C6-C12 aryl, amino, C1-C12 alkyl-substituted amino, or hydrogen. Highly suitable triazines include 2,4,6-triamine-1,3,5-triazine (melamine, CAS Reg. No. 108-78-1), melamine derivatives, melam, melem, melon, ammeline (CAS Reg. No. 645-92-1), ammelide (CAS Reg. No. 645-93-2), 2-ureidomelamine, acetoguanamine (CAS Reg. No. 542-02-9), benzoguanamine (CAS Reg. No. 91-76-9), and the like. Salts/adducts of these compounds with boric acid or phosphoric acid may be used in the composition. Examples include melamine pyrophosphate and melamine polyphosphate. Suitable cyanurate/isocyanurate compounds include salts/adducts of the triazine compounds with cyanuric acid, such as melamine cyanurate and any mixtures of melamine salts.

Suitable guanidine compounds include guanidine; aminoguanidine; and the like; and their salts and adducts with boric acid, carbonic acid, phosphoric acid, nitric acid, sulfuric acid, and the like; and mixtures comprising at least one of the foregoing guanidine compounds.

The nitrogen-containing flame-retardants are used in combination with one or more phosphorous-based compounds. The phosphinates and diphosphinates include those set forth in U.S. Pat. No. 6,255,371 to Schosser et al. Specific phosphinates mentioned include aluminum diethylphosphinate (DEPAL), and zinc diethylphosphinate (DEPZN). The phosphinates have the formula (I)

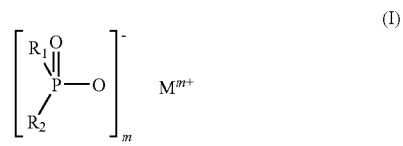

and/or formula II

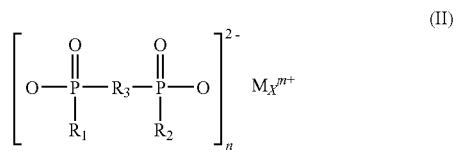

and or polymers comprising such formula I or II, where R1 and R2 are identical or different and are H, C1-C6-alkyl, linear or branched, and/or aryl; R3 is C1-C10, alkylene, linear or branched, C6-C10-arylene, -alkylarylene or -arylalkylene; M is any metal, but suitable are magnesium, calcium, aluminum or zinc, m is 1, 2 or 3; n is 1, 2 or 3; x is 1 or 2.

In one embodiment, R1 and R2 can be H, in addition to the substituents referred to set forth. This results in a hypophosphite, a subset of phosphinate, such as Calcium hypophosphite, aluminum hypophosphite and the like.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially suitable is antimony trioxide ($Sb_2O_3$). Synergists, such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame-retarding thermoplastics.

Flame-retardant additives are desirably present in an amount at least sufficient to reduce the flammability of the polyester resin, preferably to a UL94 V-0 rating. The amount will vary with the nature of the resin and with the efficiency of the additive. The amount of the flame retarding component is generally at least 1 wt. %. In one embodiment, the amount of the flame retarding component ranges from 5 wt. % to 30 wt %. In another embodiment, the amount of the flame retarding component ranges from 10 to 20 wt. %.

A molding composition of the invention may further contain a UV modifier. Suitable UV modifiers generally include a wide variety of UV absorbers. Examples of UV absorbers include, but are not limited to, salicylic acid UV absorbers, benzophenone UV absorbers, benzotriazole UV absorbers, cyanoacrylate UV absorbers and mixtures thereof.

Ultraviolet stabilizers can be used. In one embodiment, an ultraviolet stabilizer is present in an amount that is at least 0.05 wt. %. In another embodiment, the ultaviolet stabilizer is in an amount ranging from 0.05 to 1 wt. %.

In another embodiment, the molding composition may also include an impact modifier. The impact modifier component is generally a rubbery material, which when used in suitable amounts, imparts energy absorbing properties to the composition. Suitable rubbery impact modifiers include (a) methacrylate butadiene styrene rubbers, (b) acrylate rubbers, (c) acrylonitrile-styrene-acrylate rubbers, (d) high rubber graft acrylonitrile-butadiene-styrenes, (e) acrylate-olefin copolymers, (f) polyolefin modifiers, or (g) silicone-acrylic modifiers (e.g., METABLEN™ S made by Mitsubishi Rayon).

More particularly, the impact modifier can include an acrylonitrile-butadiene-styrene (ABS) polymer of the high rubber graft impact modifier. Rubber modified monovinylidene aromatic resins comprising (a) a rubber modified monovinylidene aromatic graft copolymer and (b) an ungrafted rigid copolymer, are generally prepared by graft polymerization of a mixture of a monovinylidene aromatic monomer and one or more comonomers in the presence of one or more rubbery polymeric substrates. Depending on the amount of rubber present, a separate matrix or continuous rigid phase of ungrafted rigid (co)polymer may be simultaneously obtained along with the rubber modified monovinylidene aromatic graft polymer. The resins may also be produced by blending a rigid monovinylidene aromatic copolymer with one or more rubber modified monovinylidene aromatic graft copolymers.

Typically, the rubber modified resins comprise the rubber modified graft copolymer at a level of from 5 to 100 percent by weight based on the total weight of the resin, more preferably from 10 to 95 percent by weight thereof, more preferably 20 to 90 percent by weight thereof, and most preferably from 15 to 85 percent by weight thereof; and the rubber modified resin comprises the ungrafted rigid polymer at a level of from 0 to 95 percent by weight based on the total weight of the resin, more preferably from 5 to 90 percent by weight thereof, more preferably from 10 to 80 percent by weight thereof and most preferably from 15 to 85 percent by weight thereof. Higher levels of rubber are preferred.

Especially preferred are acrylonitrile-butadiene-styrene copolymers having greater than 30% by weight rubbery polymeric substrate, preferable greater than about 45% by weight rubbery polymeric substrate. The most preferred rubbery substances comprise polybutadiene or styrene-butadiene copolymer. Also preferred are high rubber graft acrolonitrile-butadiene-styrene copolymer. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, under the trademark BLENDEX® resin grade 336 or 338. One preferred high rubber graft is CYCOLAC® C874202 resin of General Electric Company, Advanced Materials. A process for producing graft copolymer resins is set forth in U.S. Pat. No. 6,384,129 to Lowry entitled Semibatch Emulsion Process for Making Diene Rubber Latex, Rubber Latex Made Thereby, and Graft Copolymer Made Therefrom.

Other typical impact modifiers are the following materials, or blends of two or more of these materials: (1) Paraloid EXL3300, which is Butylacylate-Methacrylate core-shell rubber; (2) ASA-HRG, which is Acrylonitrile-Styrene-ButylAcrylate copolymer; (3) AES, which is Acrylonitrile-Styrene-EPDM copolymer, where EPDM is ethylene-propylene non conjugated diene elastomer; (4) Lotader AX8900, which is Ethylene-Methacrylate-Glycidylmethacrylate copolymer with Methacylate content of around 8%. The content of impact modifier is preferable less than 40% by weight, more preferable less than 30 percent, and most preferable less than 20 percent.

Core-shell copolymers, method of making core-shell copolymers and the use of core-shell copolymers as impact modifiers in combination with polycarbonate are described in U.S. Pat. Nos. 3,864,428 and 4,264,487. Suitable core-shell copolymers are those that include a rubbery "core" that has a glass transition temperature ("Tg") below about 10° C. and that comprises repeating units derived from one or more monoethylenically unsaturated monomers such as, e.g. acylate monomers, e.g. butyl acylate, and conjugated diene monomers, e.g., butadiene and a rigid "shell" that has a Tg of greater than or equal to about 10° C. and that has repeating units derived from a monoethylenically unsaturated monomer.

The amount of the impact modifier is generally at least 1 wt %. In one embodiment, the amount of the impact modifier ranges from 1 wt % to 50 wt %. In another embodiment, the amount of the impact modifier ranges from 5 to 25 wt. %.

A molding composition of the invention may further contain a heat stabilizer. Suitable heat stabilizers include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

The amount of the heat stabilizer that can be in the molding composition is generally at least 0.01 wt. %. In one embodiment, the amount of the heat stabilizer ranges from 0.01 to 0.5 wt. %. In another embodiment, the amount of the heat stabilizer ranges from 0.05 to 1 wt. %.

In another embodiment, in addition to containing the PET-derived modified PBT component, a molding composition can further include mold-release agents. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned. The mold release agent can be used in conjunction with other additives, e.g., teflon styrene acrylonitrile.

The amount of the mold release agent can be in the molding composition is generally at least 0.1 wt. %. In one embodiment, the amount of the mold release agent ranges from 0.1 to 2 wt. %. In another embodiment, the amount of the mold release agent ranges from 0.5 to 1 wt. %.

The carboxy-reactive material is a monofunctional or a polyfunctional carboxy-reactive material that can be either polymeric or non-polymeric. Examples of carboxy-reactive groups include epoxides, carbodiimides, orthoesters, oxazolines, oxiranes, aziridines, and anhydrides. The carboxy-reactive material can also include other functionalities that are either reactive or non-reactive under the described processing conditions. Non-limiting examples of reactive moieties include reactive silicon-containing materials, for example epoxy-modified silicone and silane monomers and polymers. If desired, a catalyst or co-catalyst system can be used to accelerate the reaction between the carboxy-reactive material and the polyester.

The term "polyfunctional" or "multifunctional" in connection with the carboxy-reactive material means that at least two carboxy-reactive groups are present in each molecule of the material. Particularly useful polyfunctional carboxy-reactive materials include materials with at least two reactive epoxy groups. The polyfunctional epoxy material can contain aromatic and/or aliphatic residues. Examples include epoxy novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

In one embodiment, the polyfunctional carboxy-reactive material is an epoxy-functional polymer, which as used herein include oligomers. Exemplary polymers having multiple epoxy groups include the reaction products of one or more ethylenically unsaturated compounds (e.g., styrene, ethylene and the like) with an epoxy-containing ethylenically unsaturated monomer (e.g., a glycidyl $C_{1-4}$ (alkyl)acrylate, allyl glycidyl ethacrylate, and glycidyl itoconate).

For example, in one embodiment the polyfunctional carboxy-reactive material is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the Joncryl® trade name, preferably the Joncryl® ADR 4368 material.

Another example of a carboxy-reactive copolymer is the reaction product of an epoxy-functional $C_{1-4}$(alkyl)acrylic monomer with a non-functional styrenic and/or $C_{1-4}$(alkyl) acrylate and/or olefin monomer. In one embodiment the epoxy polymer is the reaction product of an epoxy-functional (meth)acrylic monomer and a non-functional styrenic and/or (meth)acrylate monomer. These carboxy reactive materials are characterized by relatively low molecular weights. In another embodiment, the carboxy reactive material is an epoxy-functional styrene (meth)acrylic copolymer produced from an epoxy functional (meth)acrylic monomer and styrene. As used herein, the term "(meth)acrylic" includes both acrylic and methacrylic monomers, and the term "(meth) acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable $C_{1-4}$(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the carboxy reactive material is an epoxy compound having two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment the difunctional epoxy compounds have at least one of the epoxide groups on a cyclohexane ring. Exemplary difunctional epoxy compounds include, but are not limited to, 3,4-epoxycyclohexyl-3,4-epoxycyclohexyl carboxylate, bis(3,4-epoxycyclohexylmethyl) adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl) adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The difunctional epoxide compounds can be made by techniques well known to those skilled in the art. For example, the corresponding α- or β-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the tradename D.E.R.332, D.E.R.661, and D.E.R.667; from Resolution Performance Products under the trade name EPON Resin 1001F, 1004F, 1005F, 1007F, and 1009F; from Shell Oil Corporation under the tradenames Epon 826, 828, and 871; from Ciba-Giegy Corporation under the tradenames CY-182 and CY-183; and from Dow Chemical Co. under the tradename ERL-4221 and ERL-4299. As set forth in the Examples, Johnson Polymer Co is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

In still another embodiment, the carboxy-reactive material is a multifunctional material having two or more reactive groups, wherein at least one of the groups is an epoxy group and at least one of the groups is a group reactive with the polyester, but is not an epoxy group. The second reactive group can be a hydroxyl, an isocyanate, a silane, and the like.

Examples of such multifunctional carboxy-reactive materials include materials with a combination of epoxy and silane functional groups, preferably terminal epoxy and silane groups. The epoxy silane is generally any kind of epoxy silane wherein the epoxy is at one end of the molecule and attached to a cycloaliphatic group and the silane is at the other end of the molecule. A desired epoxy silane within that general description is of the following formula:

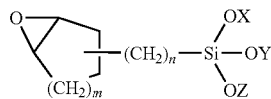

wherein m is an integer of 1, 2 or 3, n is an integer of 1 to 6, inclusive, and X, Y, and Z are the same or different, preferably the same, and are alkyl groups of one to twenty carbon atoms, inclusive, cycloalkyl of four to ten carbon atoms, inclusive, alkylene phenyl wherein alkylene is one to ten carbon atoms, inclusive, and phenylene alkyl wherein alkyl is one to six carbon atoms, inclusive. Desirable epoxy silanes within this range are compounds wherein m is 2, n is 1 or 2, desirably 2, and X, Y, and Z are the same and are alkyl of 1, 2, or 3 carbon atoms inclusive. Epoxy silanes within the range which in particular can be used are those wherein m is 2, n is 2, and X, Y, and Z are the same and are methyl or ethyl.

Such materials include, for example, β-(3,4-epoxycyclohexyl)ethyltriethoxysilane, available under the trade name CoatOSil 1770 from GE. Other examples are β-(3,4-epoxycyclohexyl)ethyltrimethoxysilane, available under the trade name Silquest A-186 from GE, and 3-glycidoxypropyltriethoxysilane, available under the trade name Silquest Y-15589 from GE.

The carboxy-reactive material is added to the polyester compositions in amounts effective to improve visual and/or measured physical properties. In one embodiment, the carboxy-reactive materials are added to the polyester compositions in an amount effective to improve the solvent resistance of the composition, in particular the fuel-resistance of the composition. A person skilled in the art may determine the optimum type and amount of any given carboxy-reactive material without undue experimentation, using the guidelines provided herein.

The type and amount of the carboxy reactive material will depend on the desired characteristics of the composition, the type of polyester used, the type and amount of other additives present in the composition and like considerations, and is generally at least 0.01 weight percent (wt. %) based on the weight of the total composition. In another embodiment, the carboxy reactive material can range from 0.1 to 2 wt % In one embodiment, the amount of the carboxy-reactive material is 0.01 to 20 wt. %. In one embodiment, the amount of the carboxy-reactive material is 0.01 to 30 wt. %, or more.

A molding composition of the invention is generally made by combining suitable amounts of the modified polybutylene terephthalate random copolymer, the polyalkylene terehphthalate, and any additives in an extruder (or a functionally equivalent compounding device) under suitable conditions. The PET-derived modified PBT component, the polyalkylene terehphthalate (and any additional components) may be compounded simultaneously, separately, or in combinations containing two or three of the components. The extrusion process can include one or more passes through an extruder.

Our invention includes methods for making compositions and articles. Our invention, for instance, includes a method of forming a composition comprising melt blending the components of any of our compositions. The method can include shaping, extruding, or molding the melt blended composition. Methods can include molding a melt blended composition into suitable articles. And our compositions include articles derived from any of our compositions.

The composition of the invention can exhibit a melt volume rate (MVR) that is higher than the MVR of the same composition made with monomer based polybutylene terephthalate homopolymers. A composition, for instance, can have a melt volume rate that is at least 10% higher as compared to a composition made with monomer based polybutylene terephthalate homopolymers, as measured on pellets according to ISO 1133 method at 250° C. and 5 kgf at dwelling time of 240 seconds and a 2.1 mm orifice. In one embodiment, the composition can have a melt volume rate in the range from 10% to 80% or higher, as compared to a composition made with monomer-derived PBT instead of the PBT random copolymers, as measured on pellets according to ISO 1133 method at 250° C. and 5 kgf at dwelling time of 240 seconds and a 2.1 mm orifice. In another embodiment, the composition can have a heat deflection temperature that is at least 80° C., as determined by ASTM D648 at 0.455 MPa.

The foregoing description is illustrative and it should be clear that a molding composition can include embodiments in which one or more of the optional components are present in the composition. As such, in one embodiment, the invention includes a molding composition that includes:

(a) from 5 to 90 wt % of a PET-derived modified PBT component containing a component selected from the group consisting of terephthalic acid groups, isophthalic acid groups, butanediol groups, ethylene glycol groups, diethylene glycol groups, and combinations thereof;

(b) from 5 to 40 wt % of a polyethylene terephthalate component.

(c) a filler component in an amount that is at least 10 wt %, (d) a polyfunctional carboxy reactive component, (e) a heat stabilizer, and (f) a UV stabilizer.

Our compositions, for instance, can include additives selected from the group consisting of flame retardants, stabilizers, quenchers, mold release agents, teflon-styrene acrylonitrile mixtures, and combinations thereof.

The invention provides previously unavailable advantages. For instance, the invention provides molding compositions that function comparably with those based on virgin PBT, despite using a structurally different modified material containing isophthalic groups and ethylene glycol groups. Since the molding compositions do not require the conventionally prepared PBT, the invention increases demand for the use of PET and thereby reduces the need to dispose PET scrap in landfills or by incineration.

Further, the process for making the PET-derived random, modified PBT copolymers can advantageously substantially reduce carbon dioxide emissions and carbon waste. Since the PET-derived polyester random modified PBT copolymers made by the inventive process are made from PET and not monomers, the process significantly reduces the amount of carbon dioxide emissions and carbon waste. Carbon waste reduction occurs because the carbon that constitutes the dimethyl terephthalate or terephthalic acid ordinarily used to make polyesters is not used, rather a PET component, e.g., polyester scrap, is replaced. In one embodiment, the process for making PET-derived modified PBT can eliminate at least 1 kg of $CO_2$ emissions for every kilogram of PET-derived modified PBT made with the process, as compared to a process that makes virgin PBT homopolymers from monomers. In another embodiment, the process for making PET-derived modified PBT can eliminate from 1 kg to 1.5 kg, or more $CO_2$ emissions for every kilogram of PET-derived modified PBT made with the inventive process, as compared to a process that makes virgin PBT homopolymers from monomers. Additionally, the energy required to make dimethyl terephthalate or terephthalic acid is not required, thereby leading to carbon dioxide savings. Additionally, there are energy savings/reduced carbon dioxide emissions when the ethylene glycol by-product is recovered and is used instead of ordinary ethylene glycol in manufacturing.

Molding compositions containing the modified polybutylene terephthalate random copolymers derived from PET exhibit such favorable environmental properties for the following reasons. PBT is conventionally synthesized from DMT or TPA and butanediol. Both DMT and TPA are raw materials that are derived from crude oil. When recycle PET is used to synthesize PBT, a savings of crude oil can be realized due to the elimination of DMT or TPA as raw materials. Both DMT and TPA are typically obtained from p-xylene, which is obtained from naphtha, which in turn is a crude oil fraction. To extract the value added product at each stage of this supply chain, energy is needed. By converting to a recycle PET route, a direct savings of energy can be realized which in turn can be translated to additional crude oil savings. The energy utilization in step 2 is achieved by combustion of some form of a fossil fuel. By eliminating this energy utilization, one can also achieve reduction of $CO_2$ emissions due to fossil fuel combustion.

Advantageously, a molding composition containing modified polybutylene terephthalate random copolymers can have a reduced $CO_2$ emissions index. The reduced $CO_2$ emissions index, as defined in this application, is the amount of $CO_2$, expressed in kg, that is saved when one (1) kg of a composition containing the modified polybutylene terephthalate random copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25.

The basis for this feature is discussed below. The difference between the amount of $CO_2$ that is created during ordinary processes for making virgin, monomer-derived PBT and the process for making the modified polybutylene terephthalate random copolymers can range from 1.3 kg to 2.5 kg, or more suitably from 1.7 to 2.2. In other words, the process for making the modified polybutylene terephthalate random copolymers creates 1.3 to 2.5 kilograms less $CO_2$, as compared to the process for making virgin PBT.

These results can be derived and verified by using material and energy balance calculations (calculations that are well know in the chemical engineering art) and comparing the amount of energy used to make modified PBT random copolymers from PET and the amount of energy used to make PBT from terephthalic acid.

To determine the ranges of the reduced $CO_2$ emissions index for our compositions (which have the modified PBT random copolymers present in an amount ranging from 5 to 90 wt %), the $CO_2$ reduction index can be calculated by multiplying the lower amount of the polybutylene butylene terephthalate present in the composition, in percentage terms, with 1.3 (0.05×1.3=0.065) and the higher amount of the polytbutylene terephthalate times 2.5. (0.90×2.5=2.25).

Accordingly, since compositions use materials that are made from polymers, e.g., polyethylene terephthalate, instead of monomers, the invention provides a novel solution of how to reduce the amount of PET being buried in landfills or incinerated. In other words, the invention can provide a valuable way to meet the unmet need to effectively use underutilized scrap PET in PBT thermoplastic molding compositions. The invention can provide an effective use of post consumer or post-industrial streams. Further, the invention can conserve our non-renewable resources and reduce the formation of greenhouse gases, e.g., $CO_2$. Compositions and articles made from such compositions having such properties can also help many customers who are increasingly being asked for products that use renewable resources or that reduce $CO_2$ emissions.

The invention is further described in the following illustrative examples in which all parts and percentages are by weight unless otherwise indicated.

EXAMPLES

Materials

The following table gives a list of the ingredients used in the examples of the inventions.

| Abbreviation | Description |
| --- | --- |
| PET Derived PBT, (0.66 iv) | Poly(1,4-butylene terephthalate) derived from PET, intrinsic viscosity of 0.66 cm3/g as measured in a 60:40 phenol/tetrachloroethane mixture |
| PET Derived PBT, (1.2 iv) | Poly(1,4-butylene terephthalate) derived from PET,, intrinsic viscosity of 1.2 cm3/g as measured in a 60:40 phenol/tetrachloroethane mixture. |
| GE PBT 195 (0.66 iv) | Poly(1,4-butylene terephthalate) from General Electric Company, intrinsic viscosity of 0.66 cm3/g as measured in a 60:40 phenol/tetrachloroethane mixture |
| GE PBT 315 (1.2 iv) | Poly(1,4-butylene terephthalate) from General Electric Company, intrinsic viscosity of 1.2 cm3/g as measured in a 60:40 phenol/tetrachloroethane mixture. |
| Ultratalc 609 | Ultrafine ground functional talc-60% SiO2; 32% MgO, average particle size less than 0.9 microns, from Stochem |
| TSAN | 50/50 wt % polytetrafluoroethylene blended with poly(styrene-co-acrylonitrile) from General Electric Co. |
| Lotader AX8900 | Random Terpolymer of Ethylene (E), Acrylic Ester (AE) and Glycidyl Methacrylate Ester (GMA) from Arkema |
| GE MBS | Methacrylate-Butadiene-Styrene emulsion copolymer impact modifier with core-shell structure from General |
| Seenox 412S | Thioester, Pentaerythritol tetrakis(3-(dodecylthio)propionate) sold as SEENOX 412-S from Crompton |
| IRAGANOX 1010 | Hindered Phenol, Pentaerythritol tetrakis(3,5-di-tert-butyl-4-hydroxyhydrocinnamate) sold as IRAGANOX 1010 |
| IRGAPHOS 168 | Phosphite, 2,4-di-tert-butylphenol phosphite (3:1) sold as IRGAPHOS 168 from Ciba Geigy |
| ERL4221 | 3,4-epoxycyclohexylmethyl-3-4-epoxy-cyclohexyl carboxylate for DOW Chemical |
| NaSt | Sodium Stearate |
| PETS | pentaerythritol tetrastearate |
| MBS-RH | Methacrylate-Butadiene-Styrene emulsion copolymer impact modifier with core-shell structure. From Rohm & |
| Acrylic Impact modifier | Acrylic impact modifier from Rohm and Haas EXL3330, Emulsion copolymer of methacrylate-butyl acrylate with core-shell structure. |
| PC100 | PC bisphenol polycarbonate Lexan ® resin from General Electric Company. Mn by GPC agaist polystyrene |
| Pentaerythritol | Tetrakis(hydroxymethyl)methane; 2,2-Bis-(hydroxymethyl)-1,3-propanediol |
| THAM | Trishydroxymethyl aminomethane as purchased from Aldrich Chemical Company, USA. |
| Glass Fiber | E glass with diameter of 10 or 13 um. Sizing-coated glass fibers are commercially available from Owens Corning Fiberglass as, for example, OCF K filament glass fiber 183F. |
| PEP-Q | Tetrakis(2,4-di-tert-butylphenyl)4,4'-biphenylene diphosphonite, SANDOSTAB PEPQ from Clariant Chemicals. |
| S2001 | Core-shell type impact modifier with silicone-acrylic-based rubber, METABLEN S-2001 from Mitsubishi Rayon. |
| Sb2O3/EVA | 85% Antimony oxide (Sb2O3) concentrate in Ethylene vinyl acetate |
| Hydrocarbon Wax Release | Alpha Olefin and hydrocarbon wax mixture (Rheolub RL-411) |
| FR Concentrate (4 component) | FR Concentrate containing tetrabromo bisphenol A polycarbonate, antimony trioxide, ethylene vinyl acetate and polytetrafluoroethylene |
| PET | Commercial Polyethylene Terephthalate. may be low iv, high iv or recycle PET from commercial sources |
| MZP | Mono zinc Phosphate |
| Brominated PC | Polycarbonate containing 25% bromine from General Electric |
| Alkane SO3Na Antistat pellets | alkane SO3 Na pellets from Clariant USA |

Procedure 1

The ingredients of the examples shown below in Tables, were extruded on a 40 mm Werner Pfleiderer Twin Screw Extruder with a vacuum vented mixing screw, at a barrel and die head temperature between 240 and 265 degrees C. and 150 to 300 rpm screw speed. The extruder has 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Procedure 2

The ingredients of the examples shown below in Tables, were extruded on a 89 mm Single Screw Extruder with a vacuum vented mixing screw, at a barrel and die head temperature between 240 and 265 degrees C. and 150 to 300 rpm screw speed. The extruder has 8 independent feeders for different raws with a downstream feeder for glass and can be operated at a maximum rate of 600 lbs/hr (272 kg/hr). The extrudate was cooled through a water bath prior to pelletizing. Test parts were injection molded on a van Dorn molding machine with a set temperature of approximately 240 to 265° C. The pellets were dried for 3-4 hours at 120° C. in a forced air circulating oven prior to injection molding.

Testing Procedure

Melt Volume Rate (MVR) on pellets (dried for 2 hours at 120° C. prior to measurement) was measured according to ISO 1133 method at dwelling time of 240 seconds and 0.0825 inch (2.1 mm) orifice.

Capillary viscosity, which is another indicator of melt-flow was measured by ASTM D3835 or ISO D11433. Dried pellets were extruded through a capillary Rheometer and the force at varied shear rates was determined to estimate the shear viscosity.

Tensile properties were tested according to ISO 527 on 150×10×4 mm (length×wide×thickness) injection molded bars at 23° C. with a crosshead speed of 5 mm/min. Izod unnotched impact was measured at 23° C. with a pendulum of 5.5 Joule on 80×10×4 mm (length×wide×thickness) impact bars according to ISO 180 method. Flexural properties or three point bending were measured at 23° C. on 80×10×4 mm (length×wide×thickness) impact bars with a crosshead speed of 2 mm/min according to ISO 178.

In other cases, injection molded parts were tested by ASTM. Notched Izod testing as done on 3×½×⅛ inch (76.2× 12.7×3.2 mm) bars using ASTM method D256. Bars were notched prior to oven aging, samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Flexural properties were measured using ASTM 790 or ISO 178 method. Biaxial impact testing, sometimes referred to as instrumented impact testing, was done as per ASTM D3763 using a 4×⅛ inch (101.6×3.2 mm) molded discs. The total energy absorbed by the sample is reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648.

A synopsis of all the relevant tests and test methods is given in Table 1.

TABLE 1

Test Methods and Descriptions

| | Test Standard | Default Specimen Type | Units |
|---|---|---|---|
| ASTM Flexural Test | ASTM D790 | Bar - 127 × 12.7 × 3.2 mm | MPa |
| ISO Flexural Test | ISO 178 | Multi-purpose ISO 3167 Type A | MPa |
| ASTM HDT Test | ASTM D648 | Bar - 127 × 12.7 × 3.2 mm | ° C. |
| ISO HDT Test | ISO 75 | Bar - 80 × 10 × 4 mm | ° C. |
| ASTM HDT Test | ASTM D648 | Bar - 127 × 12.7 × 3.2 mm | ° C. |
| ISO HDT Test | ISO 75 | Multi-purpose ISO 3167 Type A | ° C. |
| ASTM Filled Tensile Test | ASTM D638 | ASTM Type I Tensile bar | MPa |
| ISO Filled Tensile Test | ISO 527 | Multi-purpose ISO 3167 Type A | MPa |
| ISO Izod at Room Temperature | ISO 180 | Multi-purpose ISO 3167 Type A | kJ/m$^2$ |
| ASTM Izod at Room Temperature | Notched ASTM D256 | Bar - 63.5 × 12.7 × 3.2 mm | J/m |
| ASTM Multiaxial Impact | ASTM D3763 | Disk - 101.6 mm dia × 3.2 mm thick | J |
| ISO Charpy Impact | ISO 179 | Bar - 80 × 10 × 4 mm | kJ/m$^2$ |
| ISO Density | ISO 1183 | Bar - 80 × 10 × 4 mm | g/cm$^3$ |
| Shrinkage | GEP Method | Disk - 101.6 mm dia × 3.2 mm thick | % |
| ISO Melt Volume Rate Test | ISO 1133 | Pellets | cm$^3$/10 min |
| ASTM Melt Flow Rate | ASTM D1238 | Pellets | g/10 min |
| ISO Vicat Softening Temp | ISO 306 | Bar - 80 × 10 × 4 mm | ° C. |
| ISO Coefficient of Thermal Expansion | ISO 11359-2 | Multi-purpose ISO 3167 Type A | um/(m-° C.) |

The following examples illustrate the present invention, but are not meant to be limitations to the scope thereof. The examples of Tables below were all extruded and molded according to procedures as shown in Table 2.

TABLE 2

Extrusion Procedures for Different Samples

| Examples | Procedures |
|---|---|
| 1-2 | 2 |
| 3-4 | 2 |
| 5-6 | 1 |
| 7-8 | 2 |

All compositions are listed out in weight %.

Example 1 and Comparative Example 2

Purpose—The purpose of these examples is two fold. Firstly, these examples show that useful molding compositions can be made from the PET derived PBT and PET. The properties of these compositions are comparable to that of virgin PBT derived from dimethyl terephthalate. Secondly, these examples consumed lesser amount of energy to produce versus DMT based PBT. This energy refers to the non-renewable energy that is utilized in making the molding composition. It involves doing a cradle to grave energy analysis on all components of the system and calculating the total energy required to make them. In all the examples shown, this difference in energy results only due to the use of PET derived PBT versus DMT based PBT. All other ingredients remain the same and hence their energy contribution in the overall composition can be neglected.

The compositions of examples 1 and 2 are as shown in Table 1.

TABLE 3

'PET derived PBT' Composition with various additives.

| Item Description | Unit | 1 | 2 (Comparative) |
|---|---|---|---|
| GE PBT 315, 1.2 iv | % | | 43.64 |
| PET Derived PBT, 1.2 iv | % | 43.64 | |
| Hydrocarbon Wax release | % | 0.1 | 0.1 |
| HINDERED PHENOL STABILIZER | % | 0.06 | 0.06 |
| FR CONCENTRATE (4 COMPONENT) | % | 16.2 | 16.2 |
| PET, POLYETHYLENE TEREPHTHALATE | % | 10 | 10 |
| STANDARD 13 MICRON PBT GLASS | % | 30 | 30 |
| | | 100 | 100 |

The properties of the molding compostions shown in Table 4 are tabulated below.

TABLE 4

Physical Property Data for Formulations for Examples 1 and 2

| Physical Property Test | Unit | Example 1 | Example 2 |
|---|---|---|---|
| Deflection temp, 1.82 MPa (ASTM) | °C. | 175 | 173 |
| Deflection temp, Flat, 1.8 MPa (ISO) | °C. | 170.4 | 170.4 |

TABLE 4-continued

Physical Property Data for Formulations for Examples 1 and 2

| Physical Property Test | Unit | Example 1 | Example 2 |
|---|---|---|---|
| Deflection temp, 0.455 MPa (ASTM) | °C. | 207 | 210 |
| Deflection temp, 0.456 MPa (ISO) | °C. | 207.9 | 211.25 |
| Tensile Modulus (ASTM) | MPa | 15000 | 9600 |
| Tensile Stress at Yield (ASTM) | MPa | 114 | 114 |
| Tensile Stress at Break (ASTM) | MPa | 114 | 111 |
| Tensile Elongation at Yield (ASTM) | % | 2.1 | 2.2 |
| Tensile Elongation at Break (ASTM) | % | 2.1 | 2.8 |
| Tensile Modulus (ISO) | MPa | 10750.4 | 9820.8 |
| Tensile Stress at Yield (ISO) | MPa | 110.33 | 113.8 |
| Tensile Stress at Break (ISO) | MPa | 109.8 | 113.8 |
| Tensile Strain at Yield (ISO) | % | 1.87 | 2.04 |
| Tensile Strain at Break (ISO) | % | 2 | 2 |
| Notched IZOD Impact Strength (ASTM), −40, 2 LBF/FT | J/m | 65.9 | 64 |
| Notched IZOD Impact Strength (ASTM), −30, 2 LBF/FT | J/m | 65.9 | 66.3 |
| Notched IZOD Impact Strength (ISO), −40, 5.5 J | kJ/m2 | 6.85 | 6.48 |
| Notched IZOD Impact Strength (ISO), −30, 5.5 J | kJ/m2 | 6.37 | 6.62 |
| MVR, 250 C., 5 Kg, 360 s (ASTM) | $cm^3$/10 min | 4.79 | 6.85 |
| App. Viscosity @ 644.50 App shear rate @ 1/s; 250 C. | Pa-s | 738 | 785.1 |

The comparison between Example 1 and Example 2 showed that comparable impact and thermal properties of the molding composition could be obtained with the PET derived PBT. The notched izod@−30 C for both the cases can be considered equal within limits of experimental error. The same is true for the tensile elongation@break values. The process used to make the composition described in Example 1 consumed less energy by approximately 10.3 MJ/kg as compared to the molding composition described in Comparative Example 2. Thus, the composition of Example 1 was a more energy efficient molding compositions than the composition of Example 2.

Example 3 and Example 4

Comparative

Purpose—The objective of these experiments was to prove that useful molding composition containing PET derived PBT, PET and glass can be made. Also, the molding composition containing the PET derived PBT is more energy efficient than its equivalent containing DMT derived PBT.

The compositions of examples 3 and 4 are shown in Table 5.

TABLE 5

'PET derived PBT' Composition containing PET and glass

| Item Description | Unit | 3 | 4 (Comparative) |
|---|---|---|---|
| GE PBT 315, 1.2 iv | % | | 9 |
| PET Derived PBT, 1.2 iv | % | 9 | |
| GE PBT 195, 0.66 iv | % | | 36.75 |
| PET Derived PBT, 0.66 iv | % | 36.75 | |
| SEENOX 412S pentaerythritol betalaurylthiopropionate | % | 0.2 | 0.2 |
| Phosphonous Acid Ester, Pepq Powder | % | 0.15 | 0.15 |
| Fr Concentrate W/1025p | % | 13 | 13 |
| SAN encapsulated PTFE - intermediate resin | % | 0.5 | 0.5 |

TABLE 5-continued

'PET derived PBT' Composition containing PET and glass

| Item Description | Unit | 3 | 4 (Comparative) |
|---|---|---|---|
| Pentaerythritol Tetrastearate | % | 0.2 | 0.2 |
| Mono Zinc Phosphate (Mzp) | % | 0.2 | 0.2 |
| Pet, Polyethylene Terephthalate | % | 10 | 10 |
| Standard 13 Micron Pbt Glass | % | 30 | 30 |
| | | 100 | 100 |

Testing Procedures

The compositions were subjected to testing in accordance to the testing procedures described above. The properties obtained from the molding compositions are as shown in Table 6

TABLE 6

Properties of 'PET derived PBT' Composition with PET and Glass

| Physical Property Test | Unit | 3 | 4 (Comparative) |
|---|---|---|---|
| Deflection temp, 1.82 MPa (ASTM) | °C. | 198 | 199 |
| Deflection temp, Flat, 1.8 MPa (ISO) | °C. | 196.1 | 198.05 |
| Deflection temp, 0.455 MPa (ASTM) | °C. | 216 | 218 |
| Deflection temp, 0.456 MPa (ISO) | °C. | 215.6 | 218.95 |
| Tensile Modulus (ASTM) | MPa | 15900 | 12900 |
| Tensile Stress at Yield (ASTM) | MPa | 105 | 114 |
| Tensile Stress at Break (ASTM) | MPa | 105 | 115 |
| Tensile Elongation at Yield (ASTM) | % | 1.2 | 1.7 |
| Tensile Elongation at Break (ASTM) | % | 1.2 | 1.7 |
| Tensile Modulus (ISO) | MPa | 11564.2 | 8273.4 |
| Tensile Stress at Yield (ISO) | MPa | 105 | 112 |
| Tensile Stress at Break (ISO) | MPa | 111.8 | 112 |
| Tensile Strain at Yield (ISO) | % | 1.17 | 1.55 |
| Tensile Strain at Break (ISO) | % | 1.2 | 1.6 |
| Notched IZOD Impact Strength (ASTM), −40, 2 LBF/FT | J/m | 67.5 | 65.5 |
| Notched IZOD Impact Strength (ASTM), −30, 2 LBF/FT | J/m | 66.1 | 66.1 |
| Notched IZOD Impact Strength (ISO), −40, 5.5 J | kJ/m2 | 6.51 | 6.35 |
| Notched IZOD Impact Strength (ISO), −30, 5.5 J | kJ/m2 | 6.41 | 6.35 |
| MVR, 250 C., 5 Kg, 360 s (ASTM) | cm$^3$/10 min | 12.2 | 5.86 |
| App. Viscosity @ 644.50 App shear rate @ 1/s; 250 C. | Pa-s | 402.8 | 480.3 |

The comparison between Examples 3 and 4 shows that heat deflection temperature (HDT) of the composition with 'PET derived PBT' was approximately the same as that with virgin PBT. This formulation can be used to make injection molded articles having a high heat deflection temperature and also higher modulus products. The impact properties of the two formulations are also similar as seen in Table 6 The energy consumption of the Examples 3 is less than that of Example 4 by approximately 11 MJ/kg.

Example 5 and Example 6

Comparative

Purpose—The objective of these examples is to illustrate that useful molding compositions that can be used to flame retardant articles can be made from the PET derived PBT. Also, the PET derived PBT example is more energy efficient than the comparative, which is derived from DMT based PBT.

The compositions of examples 1 and 6 are shown in Table 7

TABLE 7

PET Derived PBT Composition Containing PET and Flame Retardant Additives

| Item Description | Unit | 5 | 6 (Comparative) |
|---|---|---|---|
| Pc100 | % | 29.65 | 29.65 |
| Brominated PC | % | 20 | 20 |
| GE PBT 1950.66 Iv | % | | 18 |
| PET-Derived PBT, 0.66 Iv | % | 18 | |
| SEENOX 412S Pentaerythritol Betalaurylthiopropionate | % | 0.2 | 0.2 |
| Ldpe | % | 1 | 1 |
| Hindered Phenol Stabilizer | % | 0.2 | 0.2 |
| Antimony Oxide Concentrate | % | 3.55 | 3.55 |

TABLE 7-continued

PET Derived PBT Composition Containing PET and Flame Retardant Additives

| Item Description | Unit | 5 | 6 (Comparative) |
|---|---|---|---|
| Pentaerythritol Tetrastearate | % | 0.3 | 0.3 |
| Ge Mbs Pellets | % | 9 | 9 |
| Mono Zinc Phosphate (Mzp) | % | 0.1 | 0.1 |
| Pet, Post Consumer, Green, Clear, Or Mixture | % | 18 | 18 |
| | | 100 | 100 |

Testing Procedures

The compositions were subjected to testing in accordance to the testing procedures described above. The properties obtained from the compositions in examples 5 and 6 are as shown in Table 8.

TABLE 8

Physical Properties of Molding Compositions for Flame Retardant Applications made from PET Derived PBT and PET

| Physical Property Test | Unit | 5 | 6 (Comparative) |
|---|---|---|---|
| Deflection temp, 1.82 MPa (ASTM) | ° C. | 74.3 | 78.2 |
| Deflection temp, Flat, 1.8 MPa (ISO) | ° C. | 72.45 | 71.7 |
| Deflection temp, 0.455 MPa (ASTM) | ° C. | 119 | 124 |
| Deflection temp, 0.456 MPa (ISO) | ° C. | 118.8 | 120.4 |
| Tensile Modulus (ASTM) | MPa | 2190 | 2280 |
| Tensile Stress at Yield (ASTM) | MPa | 52.8 | 53.7 |
| Tensile Stress at Break (ASTM) | MPa | 42.4 | 42.4 |
| Tensile Elongation at Yield (ASTM) | % | 4.2 | 4.3 |
| Tensile Elongation at Break (ASTM) | % | 135.2 | 110.5 |
| Tensile Modulus (ISO) | MPa | 2208.2 | 2113.6 |
| Tensile Stress at Yield (ISO) | MPa | 52.6 | 51.14 |
| Tensile Stress at Break (ISO) | MPa | 42.76 | 40.12 |
| Tensile Strain at Yield (ISO) | % | 3.74 | 3.98 |
| Tensile Strain at Break (ISO) | % | 109.76 | 112.4 |
| Notched IZOD Impact Strength (ASTM), −40, 2 LBF/FT | J/m | 151 | 166 |
| Notched IZOD Impact Strength (ASTM), −30, 2 LBF/FT | J/m | 180 | 175 |
| Notched IZOD Impact Strength (ISO), −40, 5.5 J | kJ/m2 | 18.59 | 17.34 |
| Notched IZOD Impact Strength (ISO), −30, 5.5 J | kJ/m2 | 18.02 | 17.42 |
| MVR, 250 C., 5 Kg, 360 s (ASTM) | cm³/10 min | 15.2 | 12.4 |
| App. Viscosity @ 644.50 App shear rate @ 1/s; 250 C. | Pa-s | 572.8 | 588.5 |

The above data proves that useful flame retardant molding compositions can be made from PET derived PBT and PET. This molding composition is useful in regular injection molding applications. It is seen that the data from the mechanical data of the molding composition containing PET derived PBT is similar to that of DMT based PBT.

The energy required to make Example 5 is less than that of Example 6 by 4.3 MJ/kg approximately. Thus the PET derived PBT molding composition is an ecofriendly composition versus the DMT based PBT composition.

Examples 7 and 8

Comparative

Purpose—The objective of these examples is to illustrate that useful molding compositions that can be used to injection mold articles, can be made from the PET derived PBT. Also, the PET derived PBT molding composition is more energy efficient than it's equivalent DMT based PBT formulation.

Table 9 shows the ingredients and concentrations used in Example 7 of the invention, which is a PET derived PBT composition containing PET and talc.

TABLE 9

Talc Filled Molding Composition

| Description | Unit | 7 | 8 Comparative |
|---|---|---|---|
| PET Derived PBT (0.66 iv) | % | 41.16 | |
| PET Derived PBT (1.2 iv) | % | 17.5 | |
| GE PBT 315 (0.66 iv) | % | | 41.16 |
| GE PBT 195 (1.2 iv) | % | | 17.5 |
| Talc | % | 20 | 20 |
| Low-IV, Fast-Crystallizing PET | % | 20 | 20 |
| Hindered Phenol Stabilizer | % | 0.04 | 0.04 |
| SAPP - Technical - Food Grade | % | 0.1 | 0.1 |
| Alkane SO3Na Antistatic Pellet | % | 1 | 1 |
| Pentaerythritol Tetrastearate | % | 0.2 | 0.2 |

The properties obtained from the talc filled composition are as shown in Table 10.

TABLE 10

Properties of Talc Filled Molding Compositions

| Test | Unit | 7 | 8 Comparative |
|---|---|---|---|
| Flexural Modulus (ASTM) | Mpa | 4610 | 4520 |
| Flexural Modulus (ISO) | Mpa | 4670.6 | 4582.8 |
| Deflection temp, 1.82 MPa (ASTM) | ° C. | 76 | 80 |
| Deflection temp, Flat, 1.8 MPa (ISO) | ° C. | 74 | 74 |
| Deflection temp, 0.455 MPa (ASTM) | ° C. | 182 | 188 |
| Deflection temp, 0.456 MPa (ISO) | ° C. | 167 | 174 |
| Tensile Modulus (ASTM) | Mpa | 4610 | 4040 |
| Tensile Stress at Yield (ASTM) | Mpa | 55 | 57 |
| Tensile Stress at Break (ASTM) | Mpa | 55 | 57 |
| Tensile Elongation at Yield (ASTM) | % | 2.2 | 2.5 |
| Tensile Elongation at Break (ASTM) | % | 2 | 3 |
| Tensile Modulus (ISO) | MPa | 4362 | 4281 |
| Tensile Stress at Yield (ISO) | MPa | 52 | 55 |
| Tensile Stress at Break (ISO) | MPa | 52 | 55 |
| Tensile Strain at Yield (ISO) | % | 1.9 | 2.2 |
| Tensile Strain at Break (ISO) | % | 2 | 2 |
| Notched IZOD Impact Strength (ISO) | kJ/m² | 3 | 3 |
| Notched IZOD Impact Strength (ASTM) | J/m | 36 | 32 |
| Un-Notched IZOD Impact Strength (ASTM) | J/m | 346 | 373 |

TABLE 10-continued

Properties of Talc Filled Molding Compositions

| Test | Unit | 7 | 8 Comparative |
|---|---|---|---|
| Multiaxial Impact Total Energy, 2.3 m/s, RT (ASTM) | J | 5 | 5 |
| Multiaxial Impact Total Energy, 2.3 m/s, −40 C. (ASTM) | J | 4 | 5 |
| Charpy Impact strength, RT (ISO) | $kJ/m^2$ | 8 | 9 |
| Density - ISO 1183 | $g/cm^3$ | 1.46 | 1.46 |
| Shrinkage Parallel, 120 C. | % | 1.85 | 1.96 |
| Shrinkage Perpendicular, 120 C. | % | 2.16 | 2.26 |
| MVR, 250 C., 2.16 Kg, 240 s (ISO) | $cm^3$/10 min | 72 | 49 |
| MFR, 250 C., 2.16 Kg, 360 s (ASTM) | g/10 min | 102 | 67 |
| Vicat Softening Temp, 50N, 120 C./hr (ISO) | ° C. | 173 | 183 |
| CTE, Flow (ISO) | μm/(m-° C.) | 47.9 | 47.7 |
| CTE, cross Flow (ISO) | μm/(m-° C.) | 90.9 | 91.4 |

It is interesting to note that the composition containing PET derived PBT has very similar performance attributes as that of the DMT derived PBT. Moreover, the composition containing the PET derived PBT has an energy efficiency of approximately 14 MJ/kg over the DMT based PBT composition.

Although the present invention has been described in detail with reference to certain preferred versions thereof, other variations are possible. Therefore, the spirit and scope of the appended claims should not be limited to the description of the versions contained therein.

What is claimed is:

1. A molding composition consisting essentially of:
   (a) from 5 to 90 wt % of a modified polybutylene terephthalate random copolymer having a melting temperature that is at least 200 ° C. and that (1) is derived from a depolymerized polyethylene terephthalate component selected from the group consisting of polyethylene terephthalate and polyethylene terephthalate copolymers and (2) has at least one residue derived from the depolymerized polyethylene terephthalate component comprising diethylene glycol groups in the amount of from 0.1 to 10 mole %, based on 100 mole % of glycol in the modified polybutylene terephthalate random copolymer,
   (b) from 5 to 40 wt % of a polyalkylene terephthalate component selected from the group consisting of polycyclohexane_dimethylene terephthalate, polytrimethylene terephthalate, poly-xylylene terephthalate, polydialkanolterephthalates, polybutylene terephthalate, and combinations thereof,
   (c) optionally, a filler,
   (d) optionally, at least 0.01 wt % of a carboxy reactive material,
   (e) optionally, an ultraviolet stabilizer in an amount of ranging from 0.05 to 1 wt %, and
   (f) optionally, an additive selected from the group consisting of flame retardants, stabilizers, quenchers, mold release agents, teflon-styrene acrylonitrile mixtures, impact modifiers, and combinations thereof;
   wherein components (a), (b), (c), (d), (e), and (f) have a total combined weight % of 100 wt %.

2. The composition of claim 1, wherein the residue derived from the polyethylene terephthalate component further comprises a member selected from the group consisting of isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkali salts, alkaline earth metal salts phosphorous-containing compounds and anions, sulfur-containing compounds and anions, naphthalenedicarboxylic acids, 1,3-propanediol groups, and combinations thereof.

3. The composition of claim 1, wherein the residue derived from the polyethylene terephthalate component further comprises isophthalic acid.

4. The composition of claim 1, wherein the residue derived from the polyethylene terephthalate component further comprises the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, and combinations thereof.

5. The composition of claim 1, wherein the residue derived from the polyethylene terephthalate component comprises a mixture of ethylene glycol, diethylene glycol, isophthalic acid groups, cis isomer of cyclohexane dimethanol, trans isomer of cyclohexane dimethanol, and combinations thereof.

6. The composition of claim 1, wherein the at least one residue derived from the polyethylene terephthalate component comprises mixtures of ethylene glycol, diethylene glycol, and cobalt-containing compounds.

7. The composition of claim 6, wherein the at least one residue derived from the polyethylene terephthalate component further comprises isophthalic acid groups.

8. The composition of claim 1, wherein the residue derived from the polyethylene terephthalate component further comprises isophthalic acid groups in an amount ranging from 0 to 10 mole %, based on 100 mole % of acid functionality in the modified polybutylene terephthalate random copolymer.

9. The composition of claim 1, wherein the filler is present.

10. The composition of claim 9, wherein the filler is present in an amount that is at least 0.5 wt %, and the filler is selected from the group consisting of glass fillers, ceramic fillers, carbon fillers, metal fillers, mineral fillers, nano-fillers, nano-tubes, talc, and combinations thereof.

11. The composition of claim 9, wherein the filler is a nanofiller and is present in an amount that is more than 0 and less than 0.5 wt %.

12. The composition of claim 1, wherein the carboxy reactive material is present in an amount that is at least 0.01 wt %, and the carboxy reactive material is selected from the group consisting of polymeric carboxy reactive materials, non-polymeric carboxy-reactive materials, and combinations thereof.

13. The composition of claim 9, wherein the filler is present in an amount ranging from 10 to 70 wt %.

14. The composition of claim 9, wherein the filler is present in an amount ranging from 0.1 to 10 wt %.

15. The composition of claim 1, wherein the carboxy reactive material is present in an amount ranging from 0.1 to 2 wt %.

16. The composition of claim 1, wherein the ultraviolet stabilizer is present in an amount ranging from 0.05 to 1 wt %.

17. The composition of claim 1, wherein the additive selected from the group consisting of flame retardants, stabilizers, quenchers, mold release agents, teflon-styrene acrylonitrile mixtures, impact modifiers, and combinations thereof is present.

18. The composition of claim 1, wherein the modified polybutylene terephthalate random copolymer is derived from 1,4-butanediol that is derived from 1,4-butane dicarboxylic acid that is derived from biomass.

19. The composition of claim 1, wherein the composition has a $CO_2$ reduction index that is at least 0.06 kg.

20. A method of forming a composition comprising melt blending the components of the composition of claim 1.

21. The method of claim 20, further comprising shaping, extruding, or molding the melt blended composition.

22. The method of claim 20, further comprising molding the melt blended composition.

23. An article comprising the composition of claim 1.

24. A molding composition consisting essentially of:
(a) from 5 to 90 wt % of a modified polybutylene terephthalate random copolymer that (1) is derived from a depolymerized polyethylene terephthalate component selected from the group consisting of polyethylene terephthalate and polyethylene terephthalate copolymers and (2) has at least one residue derived from the polyethylene terephthalate component comprising diethylene glycol groups in the amount of from 0.1 to 10 mole %, based on 100 mole % of glycol in the modified polybutylene terephthalate random copolymer, and a member selected from the group consisting of isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, alkali salts, alkaline earth metal salts phosphorous-containing compounds and anions, sulfur-containing compounds and anions, naphthalene dicarboxylic acids, 1,3-propanediol groups, and combinations thereof;
(b) from 5 to 40 wt % of a polyalkylene terephthalate selected from the group consisting of polyethylene terephthalate, polycyclohexane dimethylene terephthalate, copolyesters of terephthalate esters with comonomers containing cyclohexyl dimethanol and ethylene glycol, copolyesters of terephthalic acid with comonomers containing cyclohexyl dimethanol and ethylene glycol, polytrimethylene terephthalate, poly-xylylene terephthalate, polydialkanol terephthalates, polybutylene terephthalate, polyester naphthalates, and combinations thereof;
(c) optionally, a filler;
(d) optionally, at least 0.01 wt % of a carboxy reactive material;
(e) optionally, an ultraviolet stabilizer in an amount of ranging from 0.05 to 1 wt %; and
(f) optionally, an additive selected from the group consisting of flame retardants, stabilizers, quenchers, mold release agents, teflon-styrene acrylonitrile mixtures, impact modifiers, and combinations thereof;
wherein components (a), (b), (c), (d), (e), and (f) have a combined total weight % of 100 wt %; and
wherein the melt volume rate is from 10% to 80% higher, as compared to a composition made with monomer-derived PBT instead of the PBT random copolymers, as measured on pellets according to ISO 1133 method at 250 ° C. and 5 kgf at dwelling time of 240 seconds and a 2.1 mm orifice.

25. The composition of claim 24, wherein the modified polybutylene terephthalate random copolymer is derived from 1,4-butanediol that is derived from 1,4-butane dicarboxylic acid that is derived from biomass.

26. The composition of claim 24, wherein the composition has a $CO_2$ reduction index that is at least 0.06 kg.

27. A method of forming a composition comprising melt blending the components of the composition of claim 24.

28. The method of claim 27, further comprising shaping, extruding, or molding the melt blended composition.

29. The method of claim 27, further comprising molding the melt blended composition.

30. An article comprising a composition produced by the method of claim 27.

31. The composition of claim 1, wherein the total amount of the diethylene glycol groups, ethylene glycol groups, and isophthalic acid groups in the modified polybutylene terephthalate component is more than 0 and less than or equal to 23 equivalents, relative to the total of 100 equivalents of diol and 100 equivalents of diacid groups in the modified polybutylene terephthalate random copolymer.

32. The composition of claim 1, wherein the melt volume rate is from 10% to 80% higher, as compared to a composition made with monomer-derived PBT instead of the PBT random copolymers, as measured on pellets according to ISO 1133 method at 250 ° C. and 5 kgf at dwelling time of 240 seconds and a 2.1 mm orifice.

33. A molding composition consisting essentially of:
(a) from 5 to 90 wt % of a modified polybutylene terephthalate random copolymer that (1) is derived from a depolymerized polyethylene terephthalate component selected from the group consisting of polyethylene terephthalate and polyethylene terephthalate copolymers and (2) has at least one residue derived from the depolymerized polyethylene terephthalate component, and
(b) from 5 to 40 wt % of a polyalkylene terephthalate component;
wherein the modified polybutylene terephthalate random copolymer, the polyalkylene terephthalate component, and optionally, at least one additive, have a total combined weight % of 100 wt %;
(c) optionally, a filler;
(d) optionally, at least 0.01 wt % of a carboxy reactive material;
(e) optionally, an ultraviolet stabilizer in an amount of ranging from 0.05 to 1 wt %; and
(f) optionally, an additive selected from the group consisting of flame retardants, stabilizers, quenchers, mold release agents, teflon-styrene acrylonitrile mixtures, impact modifiers, and combinations thereof;
wherein components (a), (b), (c), (d), (e), and (f) have a combined total weight % of 100 wt %; and wherein the least one residue derived from the depolymerized polyethylene terephthalate component comprises antimony-containing compounds and mixtures of ethylene glycol groups, diethylene glycol groups, and isophthalic acid groups in the amount of from 0.1 to 10 mole %, based on 100 mole % of glycol and 100 equivalents of diacid groups in the modified polybutylene terephthalate random copolymer.

34. The composition of claim 33, wherein the modified polybutylene terephthalate random copolymer is derived from 1,4-butanediol that is derived from 1,4 butane dicarboxylic acid that is derived from biomass.

35. A method of forming a composition comprising melt blending the components of the composition of claim 33.

36. The method of claim 35, further comprising shaping, extruding, or molding the melt blended composition.

37. The method of claim 35, further comprising molding the melt blended composition.

38. An article comprising a composition produced by the method of claim 35.

39. A molding composition consisting essentially of:
  (a) from 5 to 90 wt % of a modified polybutylene terephthalate random copolymer having a melting temperature that is at least 200° C. and that (1) is derived from a depolymerized polyethylene terephthalate component selected from the group consisting of polyethylene terephthalate and polyethylene terephthalate copolymers and (2) has at least one residue derived from the depolymerized polyethylene terephthalate component selected from the group consisting of (a) mixtures of diethylene glycol groups and ethylene glycol groups and (b) more than 0 and less than or equal to 23 equivalents of mixtures of diethylene glycol groups, ethylene glycol groups, and isophthalic acid groups, relative to the total of 100 equivalents of diol and 100 equivalents of diacid groups in the modified polybutylene terephthalate random copolymer, and (c) combinations thereof;
  (b) from 5 to 40 wt % of a polyalkylene terephthalate component selected from the group consisting of polyethylene terephthalate, copolyesters of terephthalate esters with comonomers containing cyclohexyl dimethanol and ethylene glycol, copolyesters of terephthalic acid with comonomers containing cyclohexyl dimethanol and ethylene glycol, and polyester naphthalates;
  (c) optionally, a filler;
  (d) optionally, at least 0.01 wt % of a carboxy reactive material;
  (e) optionally, an ultraviolet stabilizer in an amount of ranging from 0.05 to 1 wt %; and
  (f) optionally, an additive selected from the group consisting of flame retardants, stabilizers, quenchers, mold release agents, teflon-styrene acrylonitrile mixtures, impact modifiers, and combinations thereof; and
  wherein components (a), (b), (c), (d), (e), and (f) have a total combined weight % of 100 wt %.

40. A method of forming a composition comprising melt blending the components of the composition of claim 39.

41. The method of claim 40, further comprising shaping, extruding, or molding the melt blended composition.

42. The method of claim 41, further comprising molding the melt blended composition.

43. An article comprising a composition produced by the method of claim 41.

\* \* \* \* \*